(12) United States Patent
Maro et al.

(10) Patent No.: US 6,333,900 B1
(45) Date of Patent: Dec. 25, 2001

(54) OPTICAL RECORDING MEDIUM, OPTICAL HEAD, AND OPTICAL RECORDING DEVICE

(75) Inventors: Tsuyoshi Maro, Otokuni-gun; Hideo Daimon, Tsukuba-gun; Osamu Ishizaki, Suita; Tatsuo Araki, Ohtsu; Takeshi Ohnuki, Yuuki-gun, all of (JP)

(73) Assignee: Hitachi Maxell, Ltd., Osaka (JP)

( * ) Notice: Subject to any disclaimer, the term of this patent is extended or adjusted under 35 U.S.C. 154(b) by 0 days.

(21) Appl. No.: 09/625,177

(22) Filed: Jul. 25, 2000

Related U.S. Application Data

(62) Division of application No. 09/063,048, filed on Apr. 21, 1998, now Pat. No. 6,217,968.

(30) Foreign Application Priority Data

Apr. 21, 1997 (JP) .................................................... 9-103331
Apr. 21, 1997 (JP) .................................................... 9-117612

(51) Int. Cl.[7] ...................................................... G11B 7/00
(52) U.S. Cl. .............................................................. 369/13
(58) Field of Search ................................. 369/13, 112.23, 369/44.14, 44.22, 44.19, 112.24, 112.25, 112.26; 360/114

(56) References Cited

U.S. PATENT DOCUMENTS

| | | | |
|---|---|---|---|
| 5,124,961 | * 6/1992 | Yamaguchi et al. | 369/13 |
| 5,386,400 | * 1/1995 | Nakayama et al. | 360/114 |
| 5,497,359 | * 3/1996 | Mamin et al. | 369/112 |
| 5,518,788 | 5/1996 | Invie . | |
| 5,543,203 | 8/1996 | Tani et al. . | |
| 5,648,162 | 7/1997 | Hirokane et al. . | |
| 5,859,814 | * 1/1999 | Kino et al. | 369/13 |
| 6,009,064 | * 12/1999 | Haiiar | 369/112 |

OTHER PUBLICATIONS

*Principal and Application of Optical Diskstorage*, edited by Yoshito Tsunada, p. 65 (1995).
*Nikkei Electronics*, No. 686, pp. 13–14, 4.7 (1997).

* cited by examiner

*Primary Examiner*—Thang V. Tran
(74) *Attorney, Agent, or Firm*—Birch, Stewart, Kolasch & Birch, LLP

(57) ABSTRACT

A magneto-optical recording medium comprises, on a substrate, a reflective layer, a first dielectric layer, a recording layer, and a second dielectric layer successively in this order, for being irradiated with a recording or reproducing light beam coming from a side of the second dielectric layer. A diamond-like carbon layer as a self-lubricating layer is formed on the second dielectric layer. An optical head comprises a floating type slider installed with a solid immersion lens. A protective film having a self-lubricating property may be also formed on a bottom surface of the slider opposing to the optical recording medium. Even when the floating position of the optical head is varied, and the optical head contacts with the surface of the optical recording medium, then the sliding scratch scarcely occurs, because the optical head smoothly glides on the recording medium surface. A lubricating layer may be further formed on the self-lubricating layer.

19 Claims, 8 Drawing Sheets

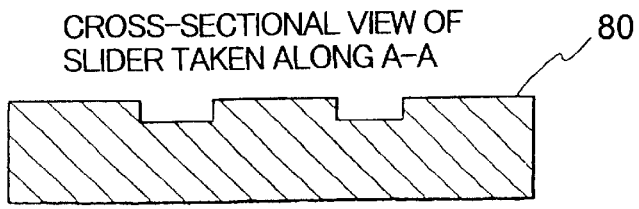
Fig.6A
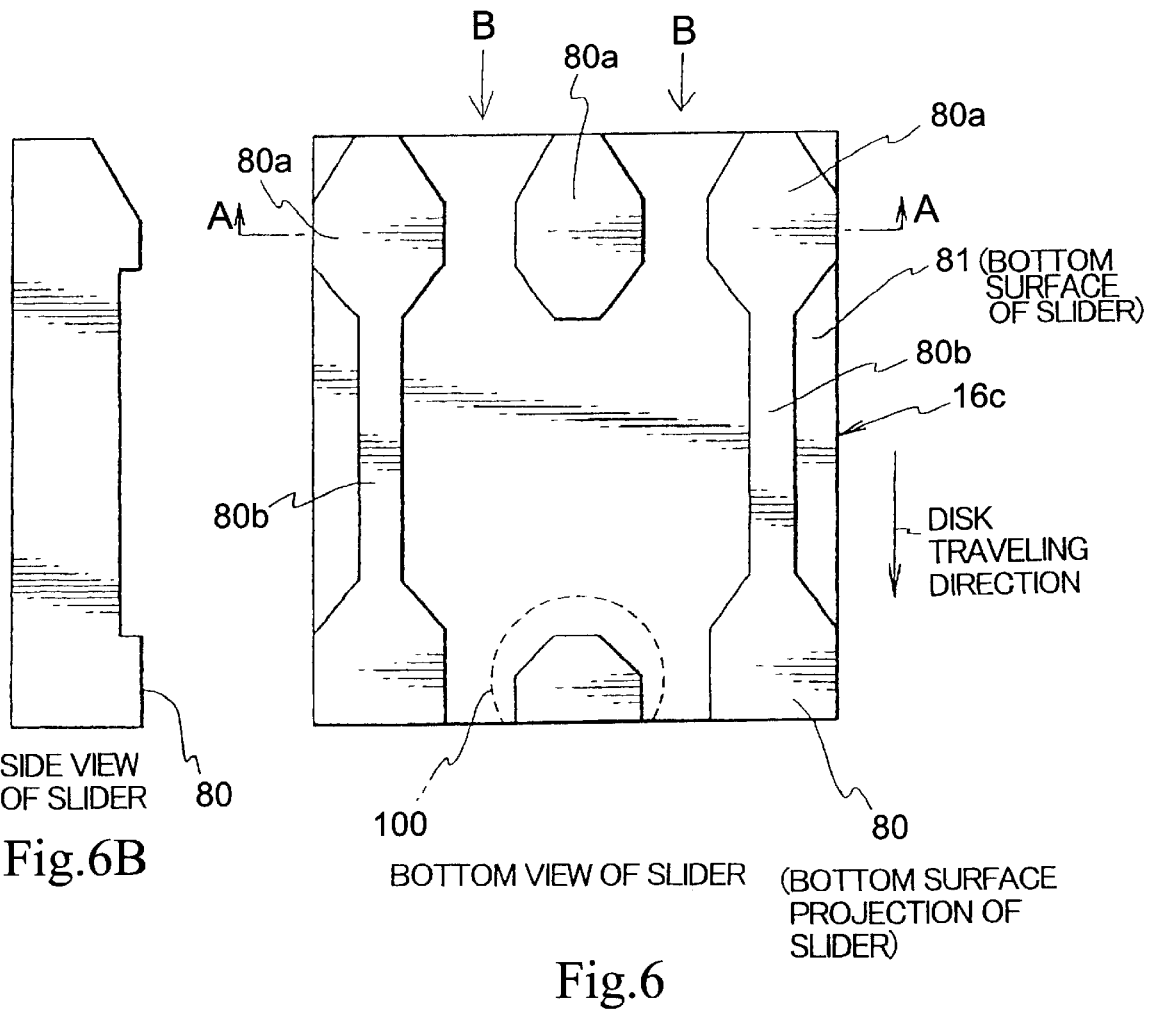
Fig.6B
Fig.6

OPTICAL RECORDING MEDIUM, OPTICAL HEAD, AND OPTICAL RECORDING DEVICE

This application is a divisional of application Ser. No. 09/063,048, filed on Apr. 21, 1998, now U.S. Pat. No. 6,217,968 the entire contents of which are hereby incorporated by reference.

BACKGROUND OF THE INVENTION

1. Field of the Invention

The present invention relates to an optical head based on the use of a solid immersion lens, and an optical recording medium on which recording and reproduction are performed by using the optical head. In particular, the present invention especially relates to an optical head and an optical recording medium which improve the durable performance for sliding movement made between the optical head based on the use of a solid immersion lens and the optical recording medium. The present invention also relates to an optical recording device installed with the same optical head.

2. Description of Related Art

Recently, the optical recording device, which is an information-recording device capable of recording a large capacity of data at a high density and quickly reproducing recorded data, is used in response to the development of the information-recording device to conform to the multimedia. As for the recording medium, the optical recording device includes those based on the use of the read-only disk such as CD and laser disks in which information is stamped on the disk upon production of the disk and which are capable of only reproduction of information, those based on the use of the write-once type disk such as CD-R which are capable of recording only once, and those based on the use of the rewritable type disk in which data can be rewritten and erased any number of times by using the magneto-optical recording system or the phase-change recording system. In such an optical recording device, data is recorded and reproduced by using a light spot obtained by focusing a laser beam up to the diffraction limit by using a lens. The size d of the light spot is represented by $d=\lambda/NA$ provided that the wavelength of the laser is $\lambda$, and the numerical aperture of the lens is NA ("Principle and Application of Optical Diskstorage", edited by Yoshito Tsunoda, Incorporated Association of Electronic Information and Communication Society (1995), p. 65).

In order to record information on the optical recording medium at a higher density, it is necessary to decrease the recording laser spot size so that minute pits and magnetic marks are formed. However, according to the expression described above, in order to decrease the light spot, the laser wavelength ($\lambda$) may be decreased, or the numerical aperture (NA) of the lens is increased. The semiconductor laser for performing reproduction on the optical disk used at present has the wavelength which is mainly 780 to 680 nm. A laser of orange color of 650 nm, which is shorter in wavelength than the above, begins to be used, for example, for the digital versatile disk (DVD-ROM). However, the short wavelength laser, which emits light of a wavelength shorter than the wavelength of the orange laser, is still under development. There is a limit to decrease the spot size by decreasing the laser wavelength.

On the other hand, as shown in FIG. 1, the numerical aperture (NA) of the lens is represented by $NA=\sin\theta$ provided that the focusing half angle of the lens is $\theta$. The numerical aperture NA has a value smaller than 1. The lens, which is used at present, has NA of about 0.5. Even if NA=0.9, which approximates to the theoretical limit, is achieved, the laser spot size can be merely reduced to be 1/1.8 at most. On the other hand, if NA is increased, then the depth of focus of the lens becomes shallow, and a problem arises in that a complicated control system should be used to maintain the focal point on the recording plane. Therefore, it is impossible to excessively increase NA. In the case of an ordinary optical recording device, a lens approximately having NA=0.6 is used at the maximum.

A method for effectively increasing NA of the lens has been suggested, in which a solid immersion lens is used in order to decrease the spot size of the laser beam (Nikkei Electronics, No. 686, pp. 13–14, 1997.4.7). As shown in FIG. 2A, when a hemispherical solid immersion lens is used, and the laser beam is allowed to come perpendicularly into the lens surface, then the equivalent NA of the optical system is represented by n×NA provided that the refractive index of the solid immersion lens is n. As shown in FIG. 2B, when a super spherical solid immersion lens is used, and the laser beam is allowed to come so that the focal point is formed on the bottom surface of the super spherical lens, then the equivalent NA is represented by $n^2 \times NA$. When the solid immersion lens is made of glass, the refractive index of glass is about 1.8. Therefore, the spot size can be decreased to be 1/1.8 when the hemispherical solid immersion lens is used, and the spot size can be decreased to be 1/3.2 when the super spherical solid immersion lens is used, respectively as compared with the case in which an ordinary objective lens is used.

When the solid immersion lens is used, the near field light, which leaks out from the solid immersion lens, is used for recording and reproduction in this technique. Therefore, it is necessary that the spacing distance between the solid immersion lens and the recording film is about ¼ of the wavelength of the laser at most. The value corresponding to thereto is 170 nm when a red laser having a wavelength of 680 nm is used. Therefore, the spacing distance is extremely smaller than the spacing distance of several mm between the optical head and the optical recording medium used in an ordinary optical recording device. Accordingly, when the solid immersion lens and the near field light are used in combination, it is necessary to use a floating type slider which is used for the magnetic head for the fixed type magnetic disk (hard disk).

FIG. 3 shows an example of the structure of the optical head for the magneto-optical recording medium based on the use of such a floating type slider. The optical head comprises an objective lens 71, a solid immersion lens 100, and a recording magnetic field-generating coil 104 incorporated into a floating type slider 102. In the case of an ordinary magneto-optical recording device, the light is radiated onto the recording layer through a transparent substrate of the magneto-optical recording medium. However, in the case of the optical head based on the use of the solid immersion lens, the spacing distance between the solid immersion lens and the recording layer is restricted as described above. Therefore, the magneto-optical recording medium adopts a structure in which a reflective layer, a first dielectric layer, a magneto-optical recording layer, and a second dielectric layer are stacked in this order on a substrate. It is necessary for the magneto-optical recording medium to be irradiated with the recording and reproducing light beam from the side of the second dielectric layer. The floating type slider adopts the CSS (contact start and stop) system in the same manner as the magnetic head. Therefore, it is necessary that the surface of the magneto-optical recording medium has a protective layer and a lubricating layer capable of withstanding CSS.

In the case of the ordinary optical disk, in order to protect the recording film, a protective film of several μm to several tens μm is formed on the side of the recording film surface opposite to the substrate by applying ultraviolet-curable resin or Si resin curable in the atmospheric air. However, in the case of the system based on the use of the solid immersion lens and the near field light, it is impossible to form the protective film made of resin on the second dielectric layer, because the protective film made of resin is thicker than the leakage distance of the near field light. Therefore, in this system, the recording and reproducing optical head is moved at a position separated by about 100 nm from the second dielectric film as the uppermost layer, in the same manner as in the fixed type magnetic disk device. For this reason, if the optical head varies its floating posture during the movement, then the optical head contacts with the second dielectric film, and its surface is scratched in some cases.

The second dielectric film, which is disposed at the uppermost layer of the magneto-optical recording medium, is formed of a hard material such as silicon nitride, silicon oxide, aluminum nitride, and silicon carbide. The film thickness thereof is 50 to 100 nm which is two to five times thicker than that used in the magnetic disk. The floating height of the recording and reproducing optical head can be 100 to 150 nm which is about two to three times higher than that used in the magnetic disk, when the solid immersion lens and the near field light are used. Therefore, the scratch, which is formed on the surface of the dielectric film due to irregular sliding movement caused by variation of the posture of the optical head, does not become so deep to arrive at the recording film. In many cases, the scratch is formed in the traveling direction of the optical head, as a grazed stripe-shaped scratch having a width of about several μm to several hundreds μm and a depth of about several tens nm. In the case of the optical disk such as an ordinary magneto-optical disk, the laser spot size is about 1 mm at the minimum on the surface of the substrate, because the reproduction is performed through the transparent substrate. Therefore, the scratch of about several μm to several tens μm formed on the substrate surface scarcely causes problems concerning recording and reproduction. However, the system, which is based on the use of the solid immersion lens and the near field light, utilizes the leakage of the laser beam having been focused up to the diffraction limit. Therefore, a problem arises in that the scratch, which merely has a width of several μm formed on the surface of the dielectric film, tends to cause any reproduction error due to variation of the amount of reflected light, i.e., the amount of reproducing light, caused by the interference at the edge of the scratch.

The present invention has been made in order to dissolve the drawbacks of the conventional technique described above, an object of which is to provide an optical recording medium in which the scratch is hardly formed on the recording medium surface due to collision between the optical head and the recording medium, and even if any scratch is formed on the medium surface, the scratch is in a degree not to cause any error during reproduction.

Another object of the present invention is to provide an optical head and a recording and reproducing device for an optical recording medium based on the use of the optical head in which the scratch is hardly formed on the recording medium surface due to collision between the optical head and the recording medium, and even if any scratch is formed on the medium surface, the scratch is in a degree not to cause any error during reproduction.

SUMMARY OF THE INVENTION

According to a first aspect of the present invention, there is provided an optical recording medium comprising, on a substrate, a reflective layer, a recording layer, and a dielectric layer, for being irradiated with an information-recording or reproducing light beam coming from a side of the dielectric layer, wherein:

a solid protective layer having a self-lubricating property is formed on the dielectric layer.

The optical recording medium of the present invention comprises the solid protective layer having the self-lubricating property on the dielectric layer opposing to the optical head. Accordingly, even if the floating position of the optical head is varied, and the optical head slides on the surface of the optical recording medium, then the optical head smoothly glides on the recording medium. Accordingly, the optical head is not caught on the surface, and the sliding scratch hardly occurs. The protective film having the self-lubricating property tends to be peeled off in a layered manner. Therefore, even when the optical head intensely collides with (slides on) the recording medium, the protective film is firstly peeled off in the layered manner. Thus, the optical head and the dielectric layer are prevented from occurrence of sharp scratches. Therefore, it is possible to suppress the error and the defect of the reproduced signal which would be otherwise caused by the scratch formed on the surface on the side of being irradiated with the reproducing light beam on the optical recording medium. The optical recording medium of the present invention may further comprise a dielectric layer between the reflective layer and the recording layer.

According to a second aspect of the present invention, there is provided an optical head comprising a solid immersion lens installed in a floating type slider, for performing recording or reproduction on an optical recording medium, wherein:

a solid protective layer having a self-lubricating property is formed at least on a surface of the floating type slider opposing to the optical recording medium.

The optical head of the present invention comprises the solid protective layer having the self-lubricating property at least on the surface of the floating type slider opposing to the optical recording medium. Accordingly, even if the floating position of the optical head is varied, and the optical head contacts with the surface of the optical recording medium, then the optical head smoothly glides on the surface of the recording medium. Therefore, the optical head is not caught on the surface. Thus, the sliding scratch hardly occurs on the optical recording medium surface or on the sliding surface of the optical head. The protective film having the self-lubricating property tends to be peeled off in a layered manner. Therefore, even when the optical head intensely slides on the recording medium, the protective film is firstly peeled off in the layered manner. Thus, the optical head and the optical recording medium surface are prevented from occurrence of sharp scratches. Therefore, it is possible to decrease the error and the defect of the reproduced signal which would be otherwise caused by the scratch on the surface on the side of being irradiated with the reproducing light beam on the optical head and the optical recording medium.

In the present invention, the term "having a self-lubricating property" means the fact that the material itself has the lubricating property by itself, for example, as in graphite and molybdenum disulfide. Those usable as the material for forming the protective film having the self-lubricating property formed on the optical recording medium and the optical head according to the present invention include, for example, carbon film, inorganic substances such as molybdenum disulfide, lead oxide, cadmium oxide, and boron oxide, and polymer compounds such as polytetrafluoroethylene, polyethylene, and nylon. Especially, the protective film is desirably those in which the film is easily formed by means of the vacuum film formation method based on the physical technique, because the recording film of the optical recording medium is usually formed by means of the vacuum film formation method based on the physical technique such as sputtering. It is desirable that the protective film transmits the laser beam without attenuation during recording and reproduction. Therefore, it is preferable to use a carbon film or a diamond-like carbon film having a small extinction coefficient.

In the optical recording medium of the present invention, if the refractive index of the protective film having the self-lubricating property is greatly different from the refractive index of the dielectric layer contacting with the protective film, then the laser beam is reflected by the interface between the both, and the laser beam is not utilized effectively. For this reason, it is desirable that an absolute value of difference between the refractive index of the protective film and the refractive index of the dielectric layer is within 0.5. It is desirable that an absolute value of difference between an extinction coefficient of the protective film and an extinction coefficient of the dielectric layer is within 0.2 in order to suppress attenuation of the laser beam.

When the carbon film as the protective film having the self-lubricating property is used for the optical recording medium and the optical head of the present invention, the quality of the film concerning hardness and optical characteristics may be controlled by allowing the carbon film to contain, for example, hydrogen, nitrogen, fluorine, and silicon. It is desirable that a film thickness of the protective film having the self-lubricating property is not less than 5 nm and not more than 50 nm. If the thickness is less than 5 nm, it is difficult to obtain sufficient sliding characteristics. There is no upper limit of the film thickness of the protective film concerning the sliding characteristics. However, a thick film causes optical loss. Further, in consideration of the use of the near field light, it is necessary that the spacing distance between the solid immersion lens on the optical head and the recording layer of the recording medium is generally within about ¼ of the wavelength of the laser to be used. Therefore, it is desirable that the upper limit of the film thickness of the protective film having the self-lubricating property is 50 nm.

When the optical head is provided with the protective film having the self-lubricating property, it is sufficient that the protective film is formed at only portions having the possibility to oppose to the optical recording medium and make sliding thereon. On condition that the protective film is not formed on the portion of the solid immersion lens, the light-transmissive property is irrelevant to the protective film having the self-lubricating property provided on the optical head. On the contrary, when the protective film having the self-lubricating property is also formed at the portion of the solid immersion lens, it is desirable to use a light-transmissive material in the same manner as the protective film having the self-lubricating property formed at the uppermost layer of the recording medium.

It is also preferable that a lubricating layer is further formed on the solid protective layer having the self-lubricating property. The lubricating layer may comprise a perfluoropolyether having a molecular weight of 1000 to 8000 and having, at least at one of molecular terminals, a group selected from at least one of hydroxyl group, carboxyl group, ester group, amino group, and piperonyl group. In order to further improve the lubricating property of the perfluoropolyether, its molecular weight is preferably not less than 1000. In order to suppress increase in viscosity, its molecular weight is preferably not more than 8000. In order to further enhance the durability for the CSS system, for example, a lubricant of perfluoropolyether can be fixed onto the protective layer by heat-treating the optical recording medium at a temperature of, for example, 50 to 120° C. after applying the lubricant of perfluoropolyether onto the protective layer. In place of the heat treatment, or in addition to the heat treatment, the lubricant may be irradiated with ultraviolet light, for example, ultraviolet light having a wavelength=254 nm. By using the both methods described above in combination, it is possible to further facilitate the fixation of the perfluoropolyether lubricant onto the protective layer. Owing to the fixed lubricant component, the slider does not make direct contact with the protective layer even when the floating type slider slides in the CSS mode. Thus, it is possible to enhance the durability of the optical recording medium. The thermal energy generated by the heat treatment and/or the ultraviolet light irradiation allows the lubricant to diffuse on the protective layer surface such as carbon. Thus, the coating property of the lubricant is improved. Further, the lubricant molecules are subjected to exchange and adsorption with respect to water existing on the surface of the protective layer, and thus the adhering force of the lubricant is increased. As a result, the lubricating effect is improved.

The lubricating layer may be formed from a mixed lubricant (two-component lubricant) containing a lubricant having an amide group at is molecular terminal and a lubricant which is liquid at ordinary temperature. When the mixed lubricant is used, it is advantageous that the solid protective layer having the self-lubricating property has a carboxyl group on its surface, because of the following reason. That is, the carboxyl group formed on the protective layer surface and the amide group of the lubricant are subjected to acid-base coupling, and thus the rigid lubricating layer is formed. When the lubricant, which is liquid at ordinary temperature, is contained, the lubricating property is improved at high temperature. The mixed lubricant is advantageous because it is soluble in cheap and versatile solvents such as ethanol, isopropyl alcohol, methyl ethyl ketone, and methyl isobutyl ketone. In order to introduce the carboxyl group onto the surface of the solid protective layer having the self-lubricating property, the solid protective layer may be irradiated with ultraviolet light, for example, ultraviolet light of $\lambda$=185 nm and 254 nm, or the solid protective layer may be plasma-treated in an oxygen atmosphere. When the carboxyl group is introduced, it is more preferable that the composition ratio (O/C) of oxygen/carbon on the surface of the solid protective layer having the self-lubricating property is not less than 0.1, in order to improve the durability for the CSS system.

The optical recording medium of the present invention may comprise a landing zone for a floating type slider at its inner circumferential portion or its outer circumferential portion. It is advantageous that the optical recording medium has dot-shaped projections having a height of 10 to 100 nm at an areal ratio of 0.1% to 5.0% in the landing zone. When the height of the dot is not less than 10 nm, it is possible to reduce the static frictional force. When the height of the dot is not more than 100 nm, it is possible to suppress the decrease in mechanical strength of the dot. When the areal ratio of the dot is not less than 0.1%, then it is possible to decrease the pressure exerted on the dot, and the abrasion of the dot caused by the CSS system is decreased. When the areal ratio of the dot is not more than 5.0%, then the contact area between the slider and the optical recording medium is decreased, and the static frictional force is reduced.

The optical recording medium of the present invention is directed to any one of optical recording media including, for example, read-only optical recording media such as CD, CD-ROM, and DVD-ROM in which information is reproduced depending on the presence or absence of concave-convex pits and holes and the difference in reflectance between the crystal phase and the amorphous phase; write-once type optical recording media such as CD-R in which recording is performed by making holes with a laser beam in an organic dye layer and an inorganic layer composed of Te compound or the like; magneto-optical recording media which comprise a recording layer of an alloy layer composed of a transition metal and a rare earth metal such as TbFeCo and DyFeCo; and phase-change optical recording media in which a recording film composed of a Ge alloy, an In alloy or the like can be reversibly changed between the crystal phase and the amorphous phase.

The substrate used in the optical recording medium of the present invention is composed of a resin such as polycarbonate, polyolefine, polymethyl acrylate, polystyrene, and nylon. Besides, it is possible to use a disk substrate made of glass, silicon, thermally oxidized silicon, or a metal such as Al and Ti.

In the present invention, the protective layer having the self-lubricating property is formed on at least any one of the surface of the optical head opposing to the optical recording medium and the surface of the optical recording medium opposing to the optical head. Thus, the effect of the present invention can be obtained. However, it is more preferable to form the protective layer having the self-lubricating property on the mutually opposing surfaces of the optical head and the recording medium.

According to a third aspect of the present invention, there is provided an optical recording device provided with an optical head, for recording or reproducing information on an optical recording medium, wherein:

the optical head has a floating type slider and a solid immersion lens installed to the floating type slider, and a solid protective layer having a self-lubricating property is formed at least on a surface of the floating type slider opposing to the optical recording medium.

The optical recording medium of the present invention is provided with the optical head including the solid protective layer having the self-lubricating property formed at least on the surface of the floating type slider opposing to the optical recording medium. Accordingly, even when the floating position of the optical head is varied, and the optical head slides on the surface of the optical recording medium, then the surface of the optical recording medium or the sliding surface of the optical head scarcely suffers from sliding scratches. Therefore, when the optical recording medium is subjected to reproduction by using the optical recording device according to the present invention, the error of the reproduced signal occurs extremely scarcely, making it possible to obtain good C/N.

The optical recording device of the present invention may be embodied as a device for performing recording and reproduction on the magneto-optical recording medium. In this embodiment, the optical head is provided with a magnetic field-applying means such as a magnetic coil.

In the optical head and the optical recording device of the present invention, the solid immersion lens may be a hemispherical solid immersion lens or a super spherical solid immersion lens. The optical recording medium, which is subjected to recording or reproduction in the optical recording device of the present invention, is preferably an optical recording medium comprising, on a substrate, a reflective layer, a first dielectric layer, a recording layer, and a second dielectric layer successively in this order, for being irradiated with a light beam coming from a side of the dielectric layer for recording or reproducing information, wherein a solid protective layer having a self-lubricating property is formed on the second dielectric layer. Accordingly, even when the floating position of the optical head is varied, and the optical head slides on the surface of the optical recording medium, then the surface of the optical recording medium or the sliding surface of the optical head more scarcely suffer from sliding scratches. The lubricating layer may be applied onto the protective layer.

According to a fourth aspect of the present invention, there is provided an optical recording medium comprising, on a substrate, a reflective layer, a recording layer, a dielectric layer, a protective layer, and a lubricating layer, for being irradiated with a recording or reproducing light beam coming from a side of the lubricating layer, wherein:

the lubricating layer comprises a perfluoropolyether having a molecular weight of 1000 to 8000 and having, at least at one of molecular terminals, a group selected from at least one of hydroxyl group, carboxyl group, ester group, amino group, and piperonyl group. The provision of the lubricant makes it possible to improve the durability for the CSS system, decrease friction upon sliding of the optical head on the optical recording medium, and suppress occurrence of scratches. A dielectric layer may be provided between the reflective layer and the recording layer.

BRIEF DESCRIPTION OF THE DRAWINGS

FIG. 6 shows a concave-convex pattern formed on the bottom surface of a slider of the optical head produced in Example 2.

DESCRIPTION OF THE PREFERRED EMBODIMENTS

Embodiments and Examples of the optical recording medium, the optical head, and the optical recording device of the present invention will be specifically explained in detail below with reference to the drawings.

EXAMPLE 1

Figure 1:
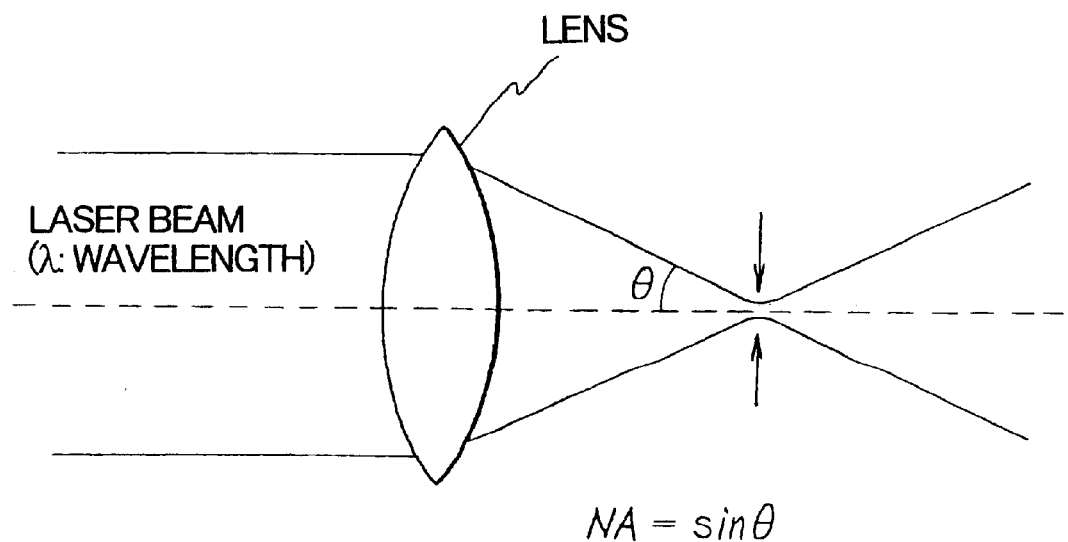
FIG. 1 illustrates a situation of a laser beam focused by a lens.
Figure 2A:
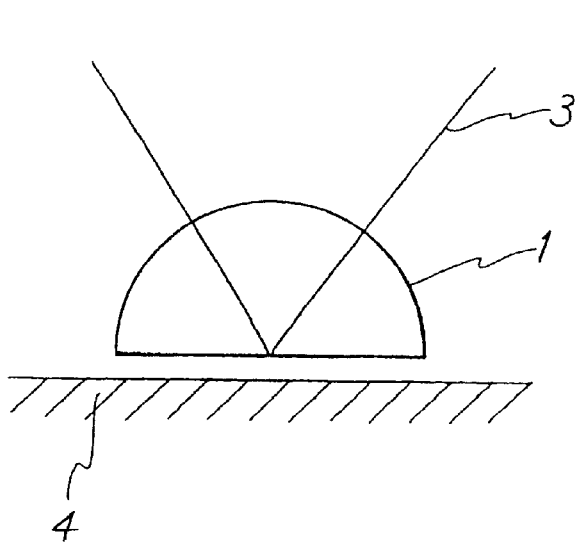
FIG. 2A illustrates an optical path obtained when a hemispherical solid immersion lens is used.
Figure 2B:
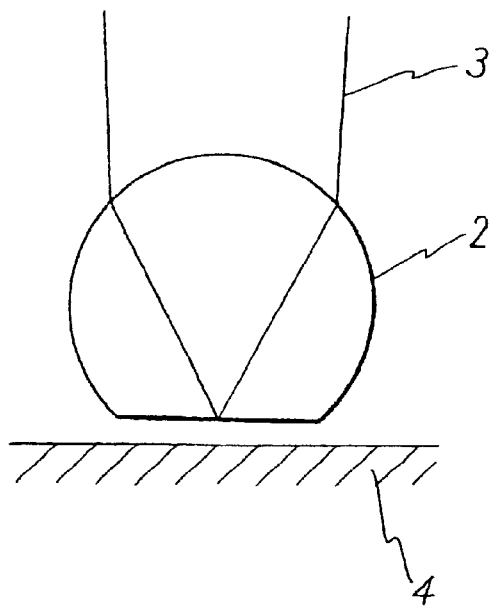
FIG. 2B illustrates an optical path obtained when a super spherical solid immersion lens is used.
Figure 3:
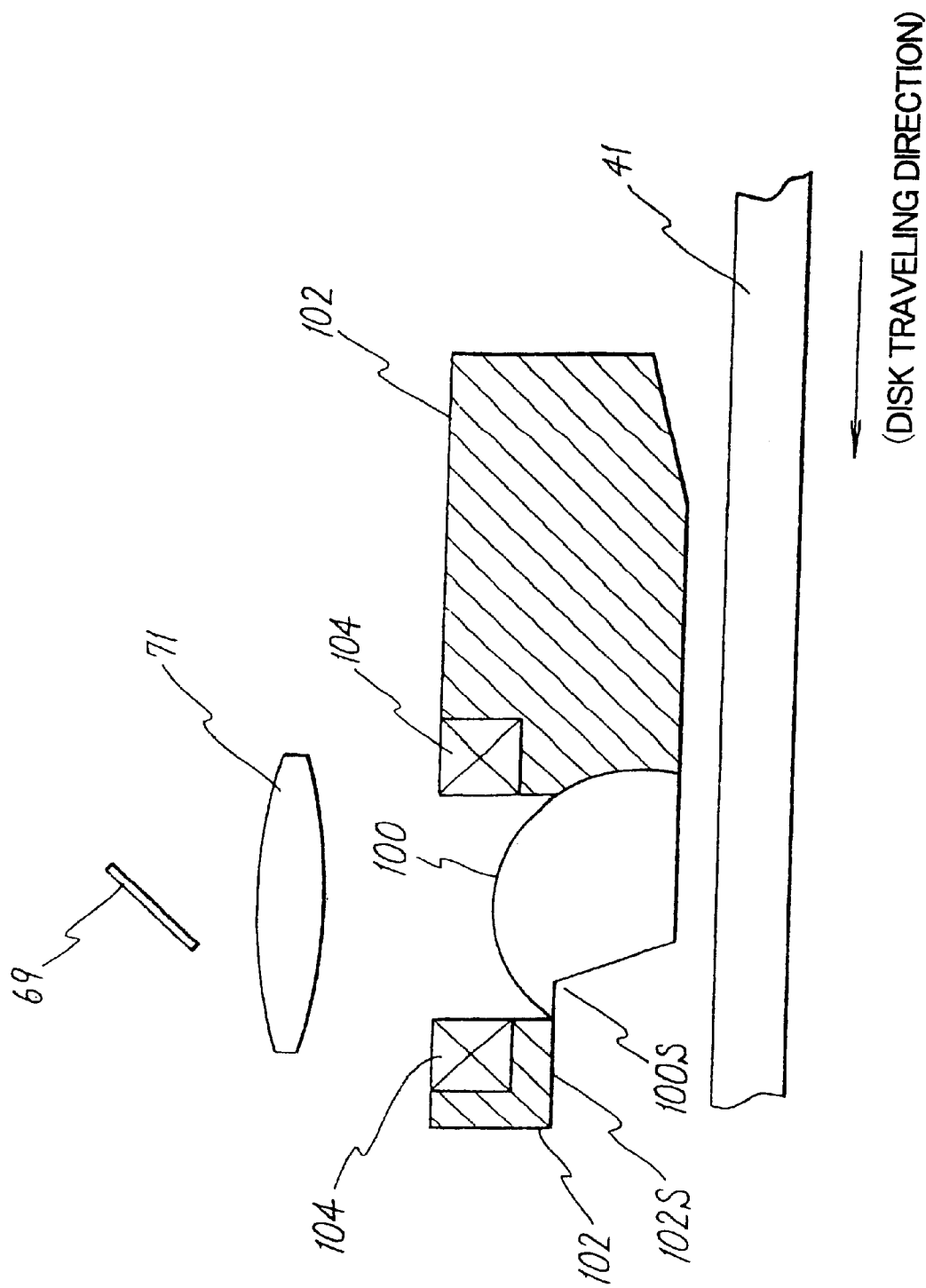
FIG. 3 shows a schematic cross-sectional view illustrating a structure of a slider type optical head used in a recording and reproducing system based on the use of a solid immersion lens and near field light.
Figure 4:
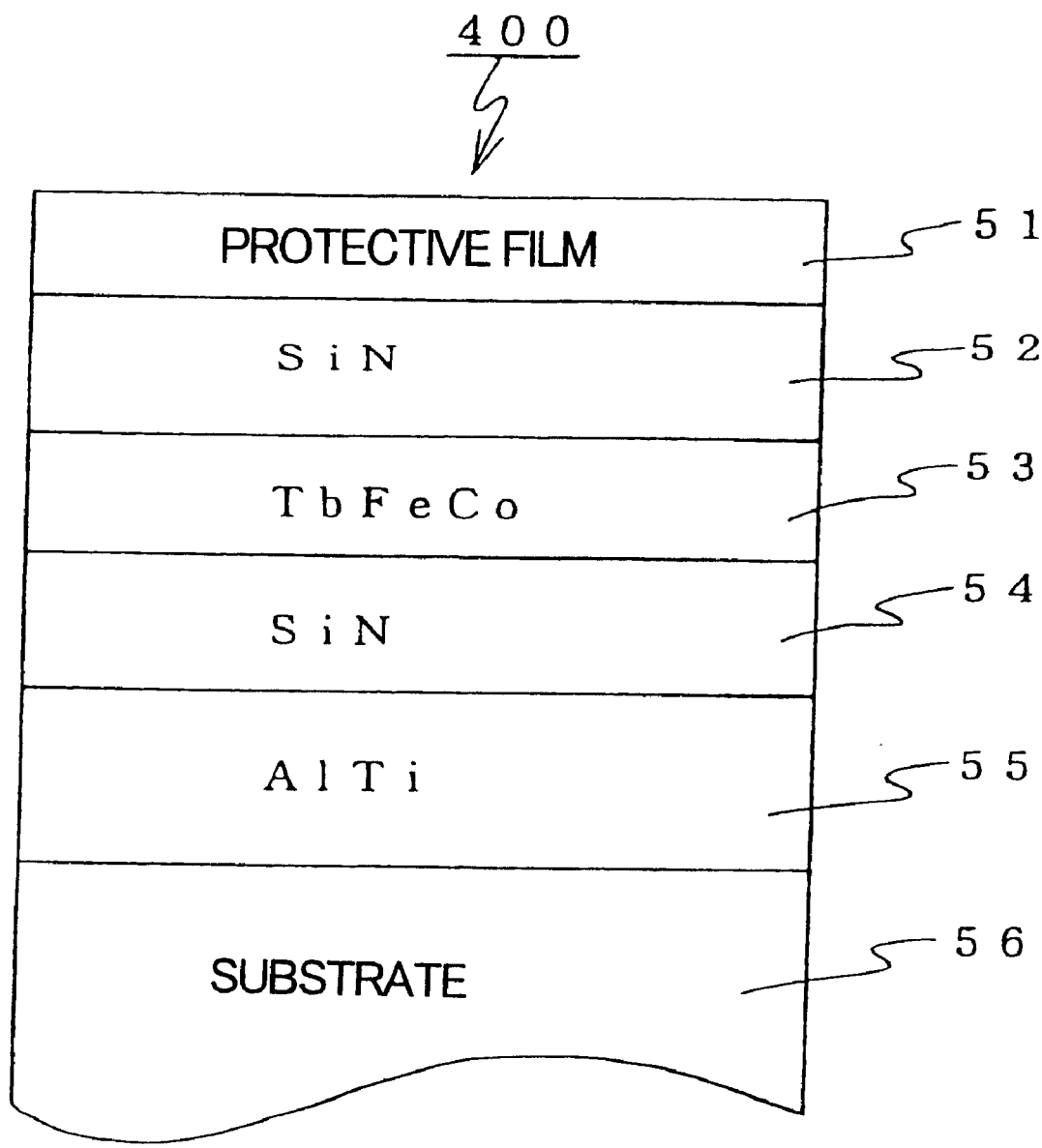
FIG. 4 shows a schematic cross-sectional view illustrating an embodiment of the optical recording medium of the present invention.

FIG. 4 shows a cross-sectional view illustrating a magneto-optical recording medium 400 depicting an embodiment of the optical recording medium of the present invention. The magneto-optical recording medium 400 having this structure was produced by means of the following method. At first, polycarbonate was subjected to injection molding by using an injection compression molding machine to produce a disk substrate 56 made of polycarbonate resin. The substrate 56 had a diameter of 95 mm, a thickness of 1.2 mm, and an internal diameter of 25 mm. Subsequently, an inline type DC magnetron sputtering apparatus was used to form, on the substrate 56, an AlTi alloy reflective layer 55 having a film thickness of 50 nm, a silicon nitride layer 54 (first dielectric layer) having a film thickness of 30 nm, a TbFeCo alloy layer 53 (recording layer) having a film thickness of 25 nm, and further a silicon nitride layer 52 (second dielectric layer) having a film thickness of 80 nm respectively. After that, the same magnetron sputtering apparatus was used to form a diamond-like carbon layer 51 having a film thickness of 20 nm as a protective film having the self-lubricating property.

In the sputtering described above, the AlTi reflective film 55 was formed by using an AlTi alloy target having a Ti content of 2 at %, and allowing Ar gas as a sputtering gas to flow at a flow rate of 80 sccm (degree of vacuum: 1.2 Pa) with an applying power of 2 kW. Each of the silicon nitride layers 54, 52 (first and second dielectric layers) was formed by using a silicon target and using Ar—$N_2$ mixed gas (mixing ratio: 1:1) at a flow rate of 80 sccm (degree of vacuum: 1.2 Pa) with an applying power of 2 kW. The TbFeCo alloy layer 52 was formed by using a $Tb_{23}Fe_{67}Co_{10}$ (at %) alloy target and allowing Ar gas to flow at a flow rate of 100 sccm (degree of vacuum: 1.5 Pa) under a condition of an applying power of 500 W. The diamond-like carbon layer 51 was formed by using an amorphous carbon target and allowing Ar-methane mixed gas (mixing ratio: 1:1) to flow at a gas flow rate of 300 sccm (degree of vacuum: 5 Pa) with an applying power of 2 kW. During this process, a negative bias voltage is also applied to the substrate side by applying the RF electric power of 200 W to the substrate side to perform the bias sputtering.

EXAMPLE 2

Figure 5:
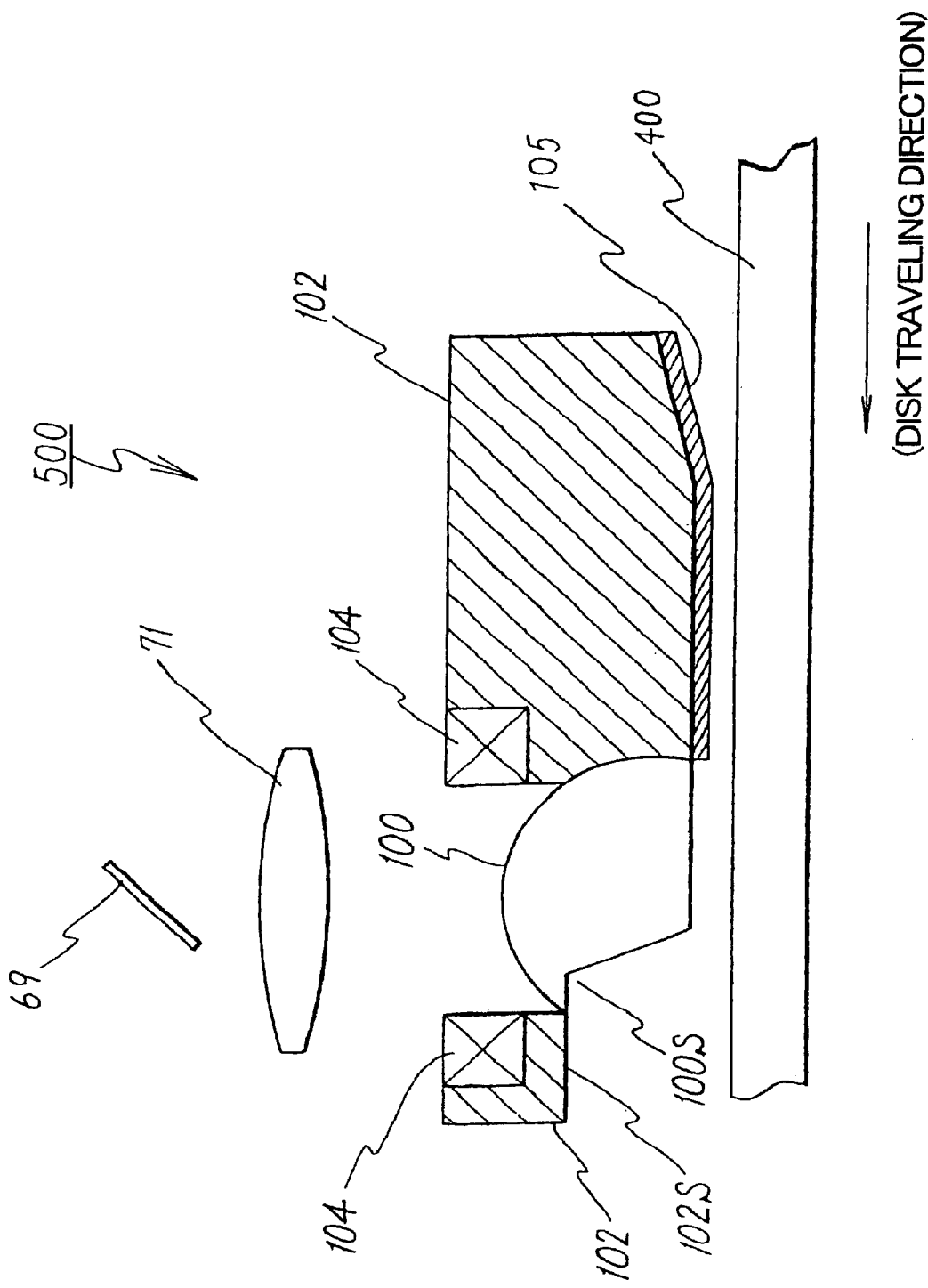
FIG. 5 shows a schematic cross-sectional view illustrating a magneto-optical head produced in Example 2 of the present invention.

FIG. 5 shows a cross-sectional view illustrating main components of an embodiment of the optical head 500 of the present invention. The optical head 500 principally comprises a floating type slider 102, a solid immersion glens 100, a magnetic coil 104, and a protective film 105 formed on an opposing surface (sliding surface) of the floating type slider 102 opposing to the optical recording medium. The optical head 500 can be produced by means of the following method. At first, in order to produce the floating type slider 102, an $Al_2O_3$—TiC composite ceramic wafer was prepared. A sliding surface having a convex-concave pattern as shown in FIG. 6 was formed on one of the wafer surfaces. The pattern is formed by means of machining or etching.

After the pattern formation, unnecessary portions were cut to extract the slider 102 of the optical head. The protective film 105 composed of diamond-like carbon was formed to have a thickness of 10 nm on the pattern formation surface by means of sputtering in the same manner as in the protective film formed on the magneto-optical recording medium. Subsequently, a hole to install the solid immersion lens 100 and the recording magnetic field-generating coil 104 was formed by means of machining or etching. The solid immersion lens 100 and the magnetic coil 104 were installed in the hole as shown in FIG. 5. In this embodiment, the solid immersion lens 100 was a super spherical solid immersion lens.

The pattern of the sliding surface shown in FIG. 6 is provided in order to control the air flow so that the floating characteristic of the optical head is stabilized. Various such patterns have been investigated. The pattern can be designed in conformity with the size and the floating amount of the optical head. In this embodiment, the slider 102 was designed to be a negative/positive pressure joint type slider. As understood from a bottom view, a left side view, and a cross-sectional view taken along a line AA of the slider 102 shown in FIG. 6, a bottom surface 81 of the slider 102 is formed with projections 80 slightly protruding from the bottom surface 81 (protruding in the front direction concerning the drawing plane in FIG. 6) and extending in the traveling direction of the disk (magneto-optical recording medium) as shown by an arrow in FIG. 6. The projection 80 is formed so that its width (length in the direction perpendicular to the disk traveling direction) is changed along the disk traveling direction. An air flow is generated when the disk (magneto-optical recording medium) is rotated with respect to the slider 102 by means of a turn table or the like. The air flow passes through a space between the projections 80 as shown by arrows B. During this process, the air flow is compressed in a narrow area interposed by wide-width portions 80a (on the line AA) of the projections 80. After that, the air flow diffuses into a wide-width area interposed by narrow-width portions 80b. Therefore, the pressure of the air flow is lowered. The lowered pressure (negative pressure) generates an attracting force which is exerted on the slider 102 from the disk. On the other hand, the floating force, which is generated by the rotation of the disk, acts on the slider 102. These forces balance with each other. Thus, the slider 102 can maintain a constant spacing distance between the slider 102 and the disk. Reference may be made for details of the negative/positive pressure joint type slider, for example, to the part concerning illustrative application to the magnetic disk described in "MR/GMR Head Technology", p. 112 (Trikepps Publishing).

Figure 7:
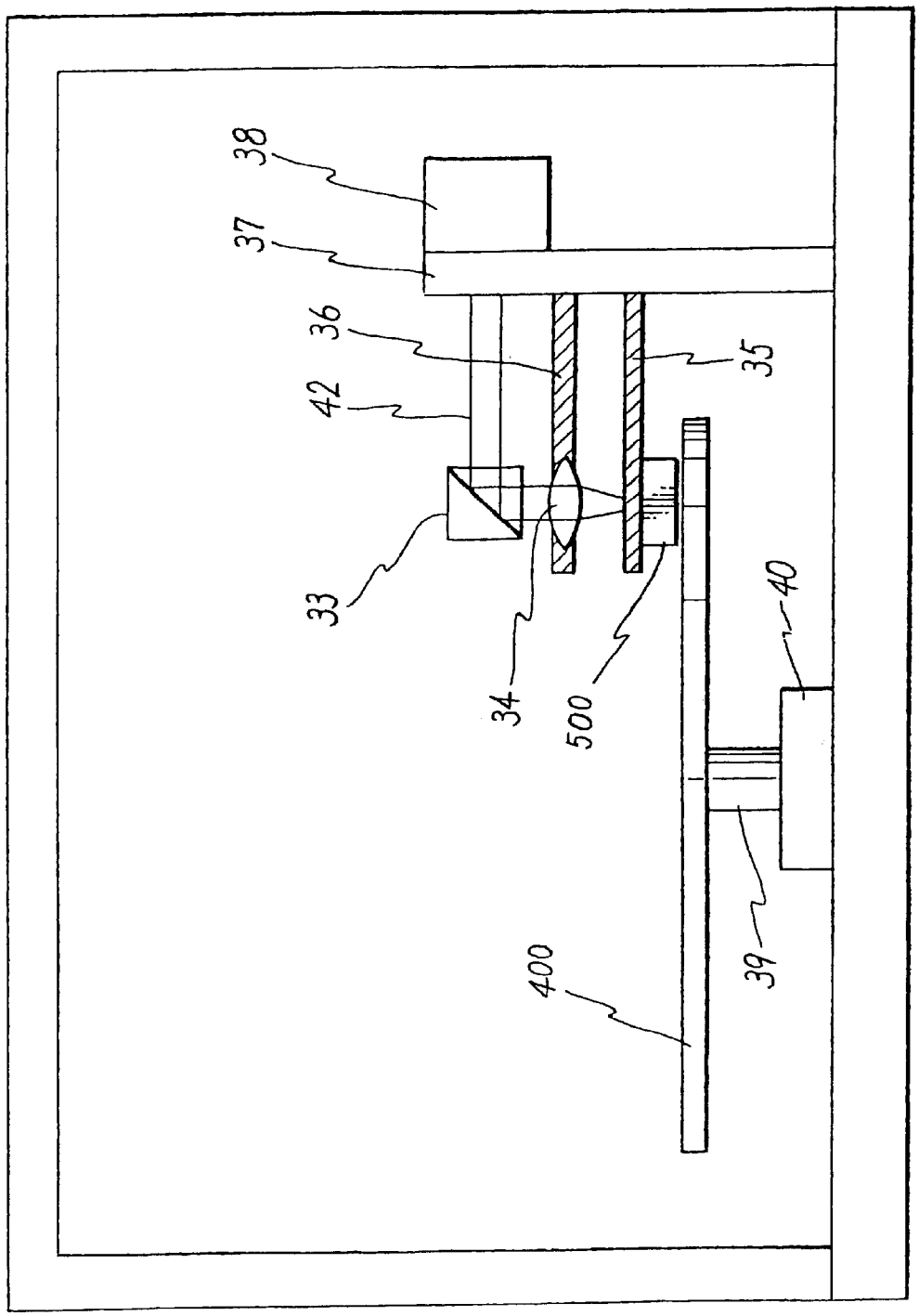
FIG. 7 shows a schematic structure of the optical recording device of the present invention.
Figure 8:
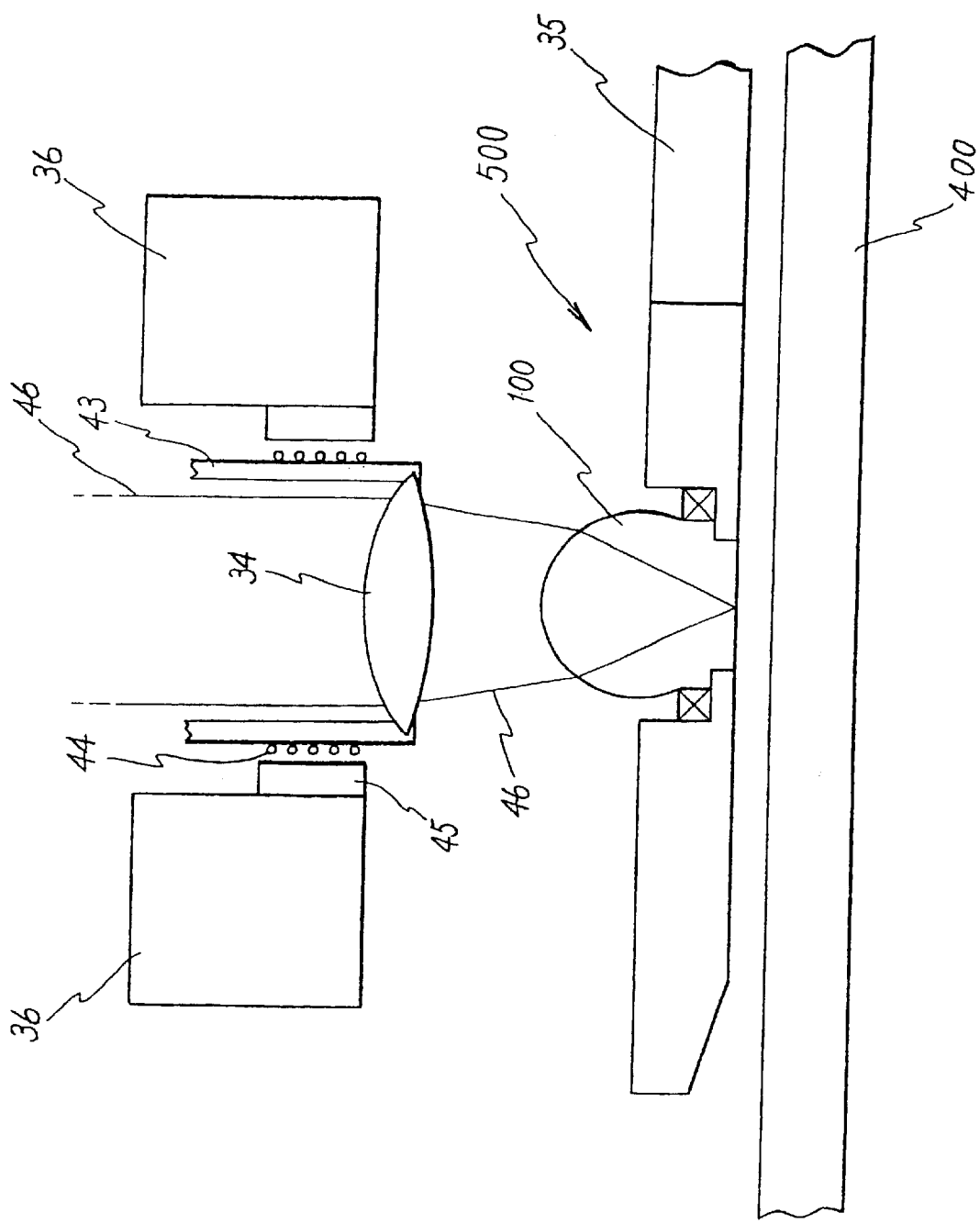
FIG. 8 shows a magnified view of a structure of an objective lens portion of the optical recording device shown in FIG. 7.

The magneto-optical recording medium 400 and the optical head 500 produced in Example 1 and Example 2 are incorporated into an optical recording device as shown in FIG. 7. The optical head 500 is incorporated into the tip of a swing arm 35 attached to a rotary actuator 37. An objective lens 34 for focusing the laser beam into the solid immersion lens in the optical head 500 is fixed on an arm 36 incorporated in the same rotary actuator 37 and mechanically fixed with the swing arm 35 to make movement therewith. Each of the swing arm 35 and the arm 36 may be constructed, for example, by a plate spring in the same manner as in the magnetic disk apparatus. As shown in FIG. 8, the objective lens 34 is provided with a driving mechanism (voice coil type actuator) based on the use of a coil 44 and a magnet 45 to maintain a constant spacing distance between the objective lens 34 and the solid immersion lens 100 so that the focal point is always formed on the bottom surface of the solid immersion lens 100. The focusing servo for allowing the laser beam 46 to always form the focal point on the bottom surface of the solid immersion lens may be constructed by using the same method as that for the focusing servo used to continuously and always focus the laser beam onto the optical disk surface in an ordinary optical storage apparatus. That is, a focus error signal may be generated with respect to the returning light beam from the solid immersion lens by means of, for example, the astigmatism method or the knife edge method, and the focusing servo may be applied on the basis of the obtained signal.

During recording or reproduction, the solid immersion lens 100 is separated by a predetermined spacing distance, i.e., 40 nm to 60 nm from the surface of the magneto-optical recording medium 400 to perform the recording or reproduction by using leakage of the near field light. For this purpose, the height position of the bottom surface (81) of the floating type slider 500 may be controlled. This control can be realized by designing or adjusting, for example, the pattern formed on the bottom surface of the floating type slider 500 (see FIG. 6), the number of rotation of the disk, and the angle (skew) formed by the disk and the slider so that the slider has the predetermined spacing distance (floating amount) with respect to the disk surface, in the same manner as in the magnetic disk device.

Figure 9:
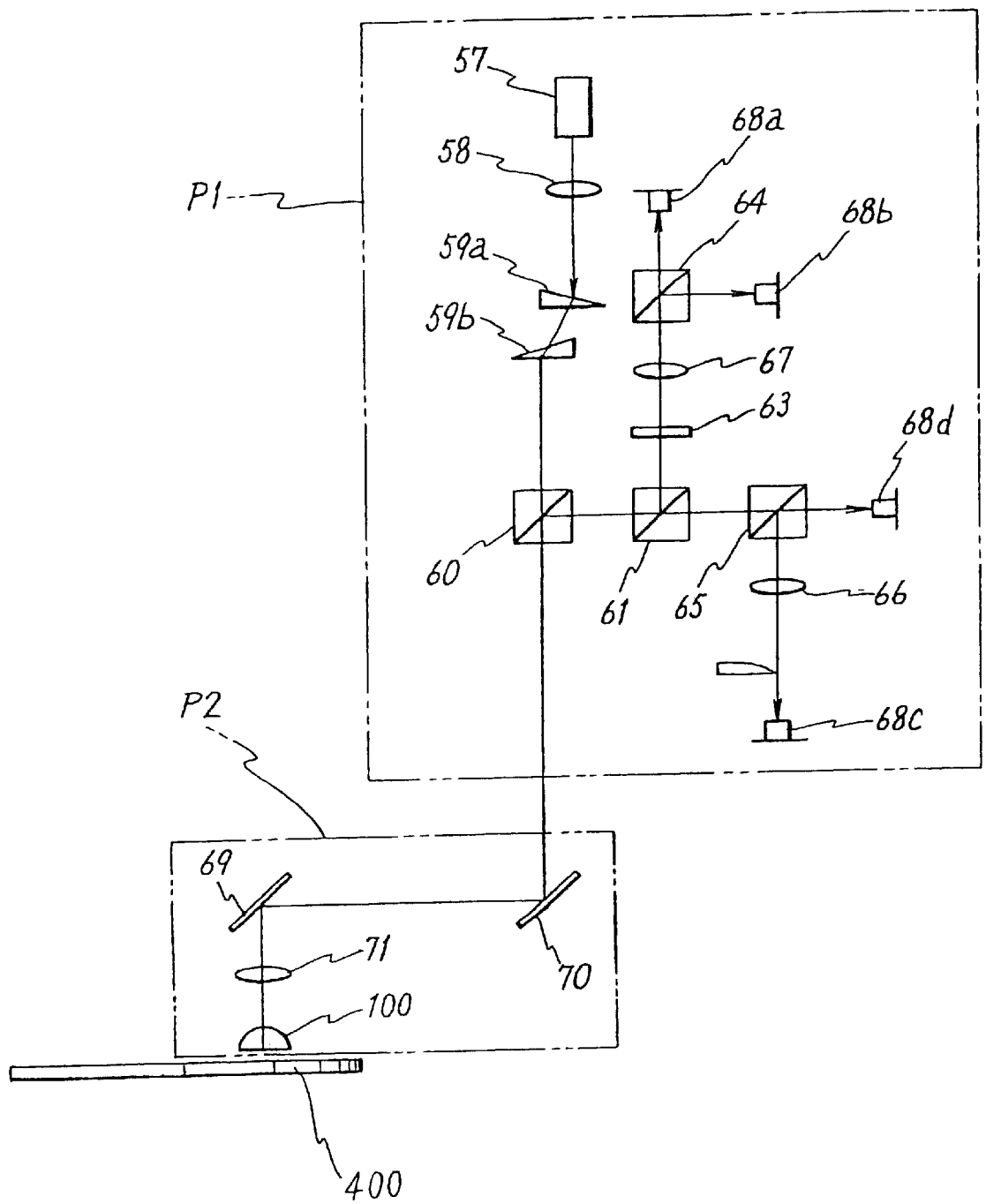
FIG. 9 illustrates an optical system used in the optical recording device concerning the embodiment of the present invention.

FIG. 9 shows an embodiment of the entire optical system of the optical recording device of the present invention. FIG. 9 shows the optical system to be used for the magneto-optical recording device. An optical system, which is equivalent to those used for the drive for performing recording and reproduction on an ordinary magneto-optical recording medium, can be used for a fixed optical system shown in FIG. 9. That is, a laser beam, which is radiated from a laser light source 57, passes through a lens 58, prisms 59a, 59b, and a beam splitter 60. The laser beam is reflected by mirrors 70, 69, and then it comes into an objective lens 71. The laser beam is condensed by the solid immersion lens 100 to form the focal point on the bottom surface of the solid immersion lens 100. The light, which leaks from the bottom surface of the solid immersion lens 100, arrives at the recording layer of the magneto-optical recording medium 400 to form a magnetic mark corresponding to a recording signal. During the recording, a recording magnetic field is applied to the magneto-optical recording medium 400. The recording can be performed by means of any system of the optical modulation system, the magnetic field modulation system, and the optical magnetic field modulation system.

Upon reproduction, a reflected light beam from the magneto-optical recording medium 400 is reflected by the mirrors 69, 70, and then it is reflected by the beam splitter 60. The light beam is divided by a beam splitter 61 into light beams directed to two beam splitters 64, 65. The light beam coming into the beam splitter 65 is further divided thereby, and resultant beams come into a focusing-detecting detector 68c and a tracking signal-detecting detector 68d respectively. The reflected light beam, which passes through a half-wavelength plate 63 and a lens 67 to come into a beam splitter 64, comes into photodetectors 68a, 68b for detecting polarized light components which are perpendicular to one another so that a reproduction signal is detected.

When the phase-change system or the write-once system is used, it is possible to use an optical system equivalent to the drives for performing recording and reproduction on the phase-change magneto-optical recording medium and the write-once optical recording medium such as CD-R respectively. In the case of such an optical system, it is sufficient to use only one detector for detecting the signal, and it is unnecessary to provide the beam splitter 64 disposed immediately before the detector.

Comparative Example 1

A magneto-optical recording medium was produced in the same manner as in Example 1 except that the protective film 51 was not formed on the silicon nitride film 52 in Example 1.

Comparative Example 2

An optical head was produced in the same manner as in Example 2 except that the protective film 105 was not formed on the bottom surface of the floating type slider 102, i.e., on the surface opposing to the optical recording medium in Example 2.

The effect of the silicon nitride film 52 (second dielectric layer) of the magneto-optical recording medium and the protective film having the self-lubricating property formed on the bottom surface of the slider of the optical head was investigated in accordance with the following method. The magneto-optical recording medium and the optical head were incorporated into the optical recording device described above in accordance with combinations shown in Table 1. The optical head was allowed to randomly seek 10,000 times between a radius of 25 mm and a radius of 45 mm. In Table 1, the magneto-optical recording medium produced in Example 1 is indicated by M1, and the optical head produced in Comparative Example 2 is indicated by H1 respectively. The magneto-optical recording medium produced in Comparative Example 1 is indicated by M2, and the optical head produced in Example 2 is indicated by H2 respectively. A pattern for the address signal for performing positioning with the optical head to be used and a pattern for the sample servo for performing tracking servo had been previously written at a track pitch of 0.8 μm with a shortest mark length of 0.4 μm on the optical recording medium by using a laser length-measuring instrument and a formatter in combination. The number of rotation of the magneto-optical recording medium was 4500 rpm. Under this condition, the floating amount of the optical head was 50 nm from the surface of the magneto-optical recording medium.

TABLE 1

|  | Optical recording medium | Optical head |
|---|---|---|
| Example 3 | M1 | H1 |
| Example 4 | M1 | H2 |
| Example 5 | M2 | H1 |
| Example 6 | M2 | H2 |

The number of defects was measured before and after 100,000 times of random seeks of the optical head for the respective combinations of the optical head and the medium. The defect was measured as follows. That is, a relatively long pattern having a mark length of 1 μm was written on all tracks (12500 tracks) between a radius of 30 mm and a radius of 40 mm. A portion, in which the amplitude was not more than 65% as measured by using the magneto-optical signal upon reproduction, was regarded as the defect. In order to avoid that dust from the surrounding environment during the measurement would adhere to the medium to cause the defect, the measurement was performed in a measurement room of a degree of cleanness of 100. Further, the measurement for the defect was performed while covering the optical recording device itself used for the measurement with a clean booth.

TABLE 2

|  | Number of defects | | Defect |
|---|---|---|---|
|  | Before random seek | After random seek | increment ratio |
| Example 3 | 1250 | 1500 | 1.20 |
| Example 4 | 1400 | 1850 | 1.32 |
| Example 5 | 1150 | 1780 | 1.54 |
| Example 6 | 1250 | 3240 | 2.59 |

The defect increment ratio referred to in Table 2 was determined in accordance with the following expression: defect increment ratio=(number of defects after random seek)/(number of defects before random seek). As understood from Table 2, the defect increment ratio is highest in the combination of the magneto-optical recording medium and the optical head not provided with the protective film. The surface portion on the side of being irradiated with light, of the magneto-optical recording medium corresponding to the portion of occurrence of the defect was investigated by using an optical microscope and a scanning type electron microscope (SEM). As a result, a grazed trace was observed in a width of several μm to several tens μm at not less than 90% of the defect portions. The scratch, which was formed when the recording and reproduction were performed with the combination of the optical head and the magneto-optical recording medium of Example 6, was sharpest and keenest. The sliding surface of the optical head was observed with an optical microscope after 100,000 times of seek. As a result, an extremely large number of scratches were observed for the optical head used in Example 6. On the contrary, few scratches were observed in other Examples 3, 4, and 5.

According to the results described above, it is possible to suppress the occurrence of scratches formed by irregular sliding movement between the head and the magneto-optical recording medium caused by variation of posture of the head associated with the movement of the optical head during the seek, and it is possible to decrease the defect associated with the occurrence of scratches, by providing the protective film such as carbon having the self-lubricating property at least on any one of the magneto-optical recording medium and the surface of the optical head opposing to the magneto-optical recording medium.

EXAMPLE 7

An Ni stamper formed with grooves and pits and an injection compression molding machine were used to produce a disk substrate made of amorphous polyolefin resin (outer diameter: 130 mm, center hole diameter: 15 mm, plate thickness: 1.2 mm) beforehand. A stationary opposed type DC magnetron sputtering apparatus was used to form, on the substrate, an AlTi alloy reflective layer 55 having a thickness of 50 nm, a silicon nitride layer having a thickness of 20 nm, a TbFeCo alloy layer having a thickness of 20 nm, and further a silicon nitride layer having a thickness of 150 nm respectively. An ion beam sputtering apparatus was used to form, on the silicon nitride layer, a diamond-like carbon (DLC) layer of 10 nm as a self-lubricating film.

In the sputtering described above, the AlTi reflective film 55 was formed by sputtering by using an AlTi alloy target having a Ti content of 2 at % while using Ar gas at a flow rate of 30 sccm (degree of vacuum: 1.0 Pa) with an applying power of 4 kW. The silicon nitride layers 54, 52 were formed by sputtering by using a silicon target while using $Ar-N_2$ mixed gas (mixing ratio: 1:1) at a flow rate of 80 sccm (degree of vacuum: 2.5 Pa) with an applying power of 4 kW. The TbFeCo alloy layer 53 was formed by sputtering by using a $Tb_{23}Fe_{67}Co_{10}$ (at %) alloy target while using Ar gas at a flow rate of 80 sccm (degree of vacuum: 2.5 Pa) with an applying power of 2 kW. The DLC layer was formed by radiating Ar ion derived at an acceleration voltage of 500 V onto a carbon target while radiating, with another ion gun, a mixed gas of Ar and methane (mixing ratio: 3:1) derived at an acceleration voltage of 100 V to the substrate.

After the film formation was completed until the formation of the DLC film, the disk was rotated while pressing a wrapping tape of an order of No. 4000 against the disk surface with air pressure to perform a tape cleaning (TC) treatment for scraping minute protrusions on the disk surface. The disk was treated with radiation for 90 seconds by using a low pressure mercury lamp for generating light beams having wavelengths of 185 nm and 254 nm in the atmospheric air. After that, a lubricating layer was formed on the DLC film by means of the spin coat method by using a solution obtained by dissolving a perfluoropolyether lubricant having principal chain of $(F((CF_2)_3-O))_n$ (wherein n is an integer from 10 to 14) and having hydroxyl group at one terminal in perfluorooctane solvent at a concentration of 0.02% by weight.

EXAMPLE 8

The disk was subjected to the film formation process until the formation of the DLC film in the same manner as in Example 7. On this disk, a lubricating layer was formed on the DLC film by means of the spin coat method by using a solution obtained by dissolving a perfluoropolyether lubricant having principal chain of $(F((CF_2)_3-O))_n$ (wherein n is an integer from 10 to 14) and having carboxyl group at one molecular terminal in perfluorooctane solvent at a concentration of 0.02% by weight.

EXAMPLE 9

The disk was subjected to the film formation process until the formation of the DLC film in the same manner as in Example 7. On this disk, a lubricating layer was formed on the DLC film by means of the spin coat method by using a solution obtained by dissolving a perfluoropolyether lubricant having principal chain of $(F((CF_2)_3-O))_n$ (wherein n is an integer from 10 to 14) and having ester group at one molecular terminal in perfluorooctane solvent at a concentration of 0.02% by weight.

EXAMPLE 10

The disk was subjected to the film formation process until the formation of the DLC film in the same manner as in Example 7. On this disk, a lubricating layer was formed on the DLC film by means of the spin coat method by using a solution obtained by dissolving a perfluoropolyether lubricant having principal chain of $(F((CF_2)_3-O))_n$ (wherein n is an integer from 10 to 14) and having piperonyl group at one molecular terminal in perfluorooctane solvent at a concentration of 0.02% by weight.

EXAMPLE 11

The disk was subjected to the film formation process until the formation of the DLC film in the same manner as in Example 7. On this disk, a lubricating layer was formed on the DLC film by means of the spin coat method by using a solution obtained by dissolving a perfluoropolyether lubricant having principal chain of $(-(CF_2)_2-O)_n(CF_2-O)_m-)$ (wherein n is an integer from 9 to 13, and m is an integer from 9 to 13) and having hydroxyl group at both molecular terminals in perfluorooctane solvent at a concentration of 0.02% by weight.

EXAMPLE 12

The disk was subjected to the film formation process until the formation of the DLC film in the same manner as in Example 7. On this disk, a lubricating layer was formed on the DLC film by means of the spin coat method by using a solution obtained by dissolving a perfluoropolyether lubricant having principal chain of $(-(CF_2)_2-O)_n(CF_2-O)_m-)$ (wherein n is an integer from 9 to 13, and m is an integer from 9 to 13) and having carboxyl group at both molecular terminals in perfluorooctane solvent at a concentration of 0.02% by weight.

EXAMPLE 13

The disk was subjected to the film formation process until the formation of the DLC film in the same manner as in Example 7. On this disk, a lubricating layer was formed on the DLC film by means of the spin coat method by using a solution obtained by dissolving a perfluoropolyether lubricant having principal chain of $(-(CF_2)_2-O)_n(CF_2-O)_m-)$ (wherein n is an integer from 9 to 13, and m is an integer from 9 to 13) and having ester group at both molecular terminals in perfluorooctane solvent at a concentration of 0.02% by weight.

EXAMPLE 14

The disk was subjected to the film formation process until the formation of the DLC film in the same manner as in Example 7. On this disk, a lubricating layer was formed on the DLC film by means of the spin coat method by using a solution obtained by dissolving a perfluoropolyether lubricant having principal chain of ($-(CF_2)_2-O)_n(CF_2-O)_m-$) (wherein n is an integer from 9 to 13, and m is an integer from 9 to 13) and having piperonyl group at both molecular terminals in perfluorooctane solvent at a concentration of 0.02% by weight.

EXAMPLE 15

The disk was subjected to the film formation process until the formation of the DLC film in the same manner as in Example 7. On this disk, a lubricating layer was formed on the DLC film by means of the dipping method by using a solution obtained by dissolving stearylamine ($C_{18}H_{37}-NH_2$) and partially fluorinated ester ($C_{17}H_{31}COOC_2H_4C_6F_{13}$) as a liquid at ordinary temperature in methyl isobutyl ketone solvent at a concentration of 0.04% by weight respectively.

EXAMPLE 16

The disk was subjected to the film formation process until the formation of the DLC film in the same manner as in Example 7. On this disk, a lubricating layer was formed on the DLC film by means of the dipping method by using a solution obtained by dissolving stearylamine $C_{18}H_{37}-NH_2$) and partially fluorinated ester $C_{17}H_{31}COOC_2H_4C_6F_{13}$) as a liquid at ordinary temperature in methyl isobutyl ketone solvent at a concentration of 0.04% by weight respectively. After the formation of the lubricant, the disk surface was heated to 100° C. to perform curing for 30 minutes by using an ultraviolet lamp.

EXAMPLE 17

The disk was subjected to the film formation process until the formation of the DLC film in the same manner as in Example 7. On this disk, a lubricating layer was formed on the DLC film by means of the dipping method by using a solution obtained by dissolving N,N-dimethylstearylamine ($C_{18}H_{37}-N(CH_3)_2$) and partially fluorinated ester ($C_{17}H_{31}COOC_2H_4C_6F_{13}$) as a liquid at ordinary temperature in methyl isobutyl ketone solvent at a concentration of 0.04% by weight respectively.

EXAMPLE 18

The disk was subjected to the film formation process until the formation of the DLC film in the same manner as in Example 7. On this disk, a lubricating layer was formed on the DLC film by means of the dipping method by using a solution obtained by dissolving stearylamine ($C_{18}H_{37}-NH_2$) and partially fluorinated ester (($CF_3)_2CF(CF_2)_{10}CH_2CH[OCOC(CH_3)_2(C_6H_{13})]CH_2[OCOC(CH_3)_2(C_6H_{13})]$) as a liquid at ordinary temperature in methyl isobutyl ketone solvent at a concentration of 0.04% by weight respectively.

EXAMPLE 19

The disk was subjected to the film formation process until the formation of the DLC film in the same manner as in Example 7. On this disk, a lubricating layer was formed on the DLC film by means of the dipping method by using a solution obtained by dissolving stearylamine ($C_{18}H_{37}-NH_2$) and partially fluorinated ester (($CF_3)_2CF(CF_2)_{10}CH_2CH(OCOC_{17}H_{31})CH_2(OCOC_{17}H_{31})$) as a liquid at ordinary temperature in methyl isobutyl ketone solvent at a concentration of 0.04% by weight respectively.

EXAMPLE 20

The disk was subjected to the film formation process until the formation of the DLC film in the same manner as in Example 7. On this disk, a lubricating layer was formed on the DLC film by means of the dipping method by using a solution obtained by dissolving stearylamine ($C_{18}H_{37}-NH_2$) and partially fluorinated ester ($[(CH_3)_2CH(CH_3)CH]_2C(CH_3)COOCH_2C_6F_{12}CH_2OCOC(CH_3)[(CH_3)HCH(CH_3)_2]_2$) as a liquid at ordinary temperature in methyl isobutyl ketone solvent at a concentration of 0.04% by weight respectively.

EXAMPLE 21

The disk was subjected to the film formation process until the formation of the DLC film in the same manner as in Example 7. On this disk, a lubricating layer was formed on the DLC film by means of the dipping method by using a solution obtained by dissolving stearylamine ($C_{18}H_{37}-NH_2$) and partially fluorinated ester ($[(CH_3)_2CH(CH_3)CH]_2C(CH_3)COOCH_2C_6F_{13}$ as a liquid at ordinary temperature in methyl isobutyl ketone solvent at a concentration of 0.04% by weight respectively.

EXAMPLE 22

The disk was subjected to the film formation process until the formation of the DLC film in the same manner as in Example 7. On this disk, a lubricating layer was formed on the DLC film by means of the dipping method by using a solution obtained by dissolving stearylamine ($C_{18}H_{37}-NH_2$) and $CH_3(CH_2)_{110}(CH_2)_3NHCOCF_2(OC_2F_4)_{10}(OCF_2)_{10}CF_2CONH(CH_2)_{30}(CH_2)_{11}CH_3$ as a liquid at ordinary temperature in methyl isobutyl ketone solvent at a concentration of 0.04% by weight respectively.

The effect of the formation of the protective film having the self-lubricating property on the optical recording medium and the formation of the lubricant layer thereon was investigated in accordance with the same method as that used in Examples 3 to 6. As for the optical head, the optical head H1 produced in Example 2 and the optical head H2 produced in Comparative Example 1 were used. As for the servo signal, a push-pull signal from the groove (track pitch: 0.4 μm, groove width: 0.1 μm, groove depth: 60 nm) transferred from the stamper onto the substrate during the injection molding was used. The address information was obtained from the pit portion previously formed on the substrate in accordance with a similar method. The number of rotation of the optical recording medium was 3600 rpm. During this procedure, the floating amount of the optical head was 70 to 80 nm. The increase or decrease in number of defects was measured before and after the 100,000 times of random seek operations performed by using the optical head, for combinations of Examples 7 to 20 and the optical heads H1 and H2. A portion, in which the reflected signal from the land portion was not more than 65% in a state of application of tracking, was regarded as the defect. The measurement was performed for a portion between a radius of 30 mm and a radius of 40 mm (25000 tracks).

Results are summarized in Table 3 for the case of the use of the optical head H1 and in Table 4 for the case of the use of the optical head H2.

TABLE 3

| | Before random seek | After random seek | Defect increment ratio |
|---|---|---|---|
| Example 7 | 3151 | 3529 | 1.12 |
| Example 8 | 3203 | 3651 | 1.14 |
| Example 9 | 3125 | 3750 | 1.20 |
| Example 10 | 2938 | 3555 | 1.21 |
| Example 11 | 3003 | 3831 | 1.28 |
| Example 12 | 3267 | 3855 | 1.18 |
| Example 13 | 3304 | 3667 | 1.11 |
| Example 14 | 3503 | 4169 | 1.19 |
| Example 15 | 3265 | 3624 | 1.11 |
| Example 16 | 3347 | 4619 | 1.38 |
| Example 17 | 3980 | 5532 | 1.39 |
| Example 18 | 2995 | 3594 | 1.20 |
| Example 19 | 3280 | 4067 | 1.24 |
| Example 20 | 3133 | 3822 | 1.22 |
| Example 21 | 3341 | 3990 | 1.19 |
| Example 22 | 3119 | 4223 | 1.35 |

TABLE 4

| | Before random seek | After random seek | Defect increment ratio |
|---|---|---|---|
| Example 7 | 3304 | 4560 | 1.38 |
| Example 8 | 3205 | 3942 | 1.23 |
| Example 9 | 3516 | 4922 | 1.40 |
| Example 10 | 3618 | 4450 | 1.23 |
| Example 11 | 3133 | 4355 | 1.39 |
| Example 12 | 3642 | 5463 | 1.50 |
| Example 13 | 3705 | 4224 | 1.14 |
| Example 14 | 3369 | 4750 | 1.41 |
| Example 15 | 3897 | 5144 | 1.32 |
| Example 16 | 3514 | 4322 | 1.23 |
| Example 17 | 4566 | 5023 | 1.10 |
| Example 18 | 4012 | 4574 | 1.14 |
| Example 19 | 3064 | 3617 | 1.18 |
| Example 20 | 3214 | 3664 | 1.14 |
| Example 21 | 3131 | 4133 | 1.32 |
| Example 22 | 4200 | 5882 | 1.40 |

The defect increment ratio referred to in the tables was determined in accordance with the following expression: defect increment ratio=(number of defects after random seek)/(number of defects before random seek). As understood from Tables 3 and 4, it is also possible to suppress the increase of the defect by providing the lubricating layer on the self-lubricating protective film of the optical recording medium. The surface after the random seek was investigated for the optical recording media show n in Tables 3 and 4 by using an optical microscope and a scanning type electron microscope. As a result, few defects were observed.

EXAMPLES 23 to 34

A glass substrate ( outer diameter: 95 mm, center hole diameter: 25 mm, plate thickness: 1 mm, track pitch: 0.5 μm, groove width: 0.2 μm, groove depth: 70 nm) was previously prepared, in which patterning was performed by using a photomask, and grooves and pits were formed by means of dry etching, in accordance with the same method as that used in Example 1. on this glass substrate, a stationary opposed type DC magnetron sputtering apparatus was used to form films of an AlTi alloy reflective layer 55 having a thickness of 50 nm, a silicon nitride layer having a thickness of 20 nm, a TbFeCo alloy layer having a thickness of 20 nm, and further a silicon nitride layer having a thickness of 120 nm. Sputtering was performed by using carbon and Si-containing carbon target with a mixed gas of Ar and $CH_4$ thereon, simultaneously with which RF electric power was applied to the substrate side to apply a negative bias voltage. In this state, the mixing ratio of Ar and $CH_4$, the Si content, and the bias voltage were controlled to form a self-lubricating film having a refractive index of 1.9 to 2.5 and an extinction coefficient of 0.01 to 1.0.

The silicon nitride film at the uppermost layer was also formed as a silicon nitride layer having a refractive index of 1.9 to 2.1 by controlling the mixing ratio of Ar and nitrogen during the film formation.

After the formation of the protective film, the disk was rotated while pressing a wrapping tape of an order of No. 4000 against the disk surface with air pressure to perform a tape cleaning (TC) treatment for scraping minute protrusions on the disk surface. The disk was treated with radiation for 90 seconds by using a low pressure mercury lamp for generating light beams having wavelengths of 185 nm and 254 nm in the atmospheric air. After that, a lubricating layer was formed on the protective film by means of the spin coat method by using a solution comprising a perfluoropolyether lubricant having principal chain of $(F((CF_2)_3—O))_n$ and having hydroxyl group at one terminal in perfluorooctane solvent at a concentration of 0.02% by weight.

Recording and reproduction characteristics of the optical recording media produced in Examples 23 to 34 were evaluated by using the same measuring apparatus as that used in the evaluation for the defect performed in Examples 3 to 22. The evaluation was performed such that a relatively long mark was recorded with a mark length of 0.8 μm and a linear velocity of 14 m/s, and the carrier level and the noise level were measured. The reflection signal level concerning the groove was simultaneously measured.

TABLE 5

| | Protective Film | | Uppermost layer SiN | Difference in refractive index 1) | Difference in extinction coefficent 2) | Reflection signal level (mV) | C (dBm) | N (dBm) | CNR (dB) |
|---|---|---|---|---|---|---|---|---|---|
| Example | Refractive Index | Extinction coefficient | Refractive Index | | | | | | |
| 23 | 2.5 | 0.01 | 1.9 | 0.6 | 0.01 | 99 | -20.0 | -69.8 | 49.8 |
| 24 | 2.4 | 0.02 | 1.95 | 0.45 | 0.02 | 101 | -19.8 | -70.0 | 50.2 |
| 25 | 2.2 | 0.03 | 2.0 | 0.2 | 0.03 | 101 | -19.8 | -70.2 | 50.4 |
| 26 | 2.0 | 0.04 | 2.0 | 0 | 0.04 | 102 | -19.7 | -70.3 | 50.6 |
| 27 | 1.8 | 0.02 | 2.0 | 0.2 | 0.02 | 99 | -19.9 | -70.2 | 50.3 |
| 28 | 1.6 | 0.01 | 2.1 | 0.5 | 0.01 | 96 | -20.3 | -70.3 | 50.0 |
| 29 | 2.4 | 0.01 | 2.0 | 0.4 | 0.01 | 100 | -20.1 | -70.3 | 50.2 |

TABLE 5-continued

| Example | Protective Film Refractive Index | Protective Film Extinction coefficient | Uppermost layer SiN Refractive Index | Difference in refractive index 1) | Difference in extinction coefficient 2) | Reflection signal level (mV) | C (dBm) | N (dBm) | CNR (dB) |
|---|---|---|---|---|---|---|---|---|---|
| 30 | 2.4 | 0.05 | 2.0 | 0.4 | 0.05 | 99 | −20.2 | −70.4 | 50.2 |
| 31 | 2.4 | 0.1 | 2.0 | 0.4 | 0.1 | 97 | −19.8 | −69.7 | 49.9 |
| 32 | 2.3 | 0.3 | 2.1 | 0.2 | 0.3 | 94 | −19.6 | −69.2 | 49.6 |
| 33 | 2.3 | 0.5 | 2.1 | 0.2 | 0.5 | 93 | −19.4 | −68.6 | 49.2 |
| 34 | 2.5 | 0.7 | 2.1 | 0.4 | 0.7 | 88 | −18.9 | −67.9 | 49.0 |

1) Difference in refractive index: absolute value of difference between refractive index of protective film and refractive index of SiN layer.
2) Difference in extinction coefficient: absolute value of difference between extinction coefficient of protective film and extinction coefficient (0.01) of SiN layer.

EXAMPLE 35

A polycarbonate substrate having a size of 3.5 inches provided with a dot texture having a height of 35 nm and an areal ratio of 1.5% in CSS zone of a width of 4 mm at the inner circumference of the disk, lands, and grooves was produced by means of the injection molding method based on the use of an Ni stamper. An AlTi reflective layer of 50 nm, a first SiNx layer (first dielectric layer) of 30 nm, a TbFeCo recording layer (magneto-optical recording layer) of 20 nm, and a second SiNx layer (second dielectric layer) of 80 nm were successively formed by sputtering on the substrate.

Subsequently, a protective film (diamond-like carbon) composed of hydrogen-containing carbon of 20 nm was formed on the second SiNx layer by means of the plasma CVD method based on the use of a high frequency of 13,56 MHz by using methane as a monomer gas and using hydrogen as a carrier gas.

After that, a magneto-optical recording medium was produced by spin-coating, on the protective film, a perfluoropolyether lubricant having principal chain of $(F((CF_2)_3-O))_n$ (wherein n is an integer from 10 to 14) and having alcohol group at one molecular terminal at a concentration of 0.02 wt. % by using a solvent of perfluorooctane. A protective film of 10 nm composed of hydrogen-containing diamond-like carbon was formed by means of the plasma CVD method by using methane gas as a monomer gas and using hydrogen gas as a carrier gas on the surface of the floating type slider having a solid immersion lens and a coil for modulating the magnetic field on the side of the optical head in the same manner as shown in FIGS. 5 and 8.

EXAMPLE 36

A magneto-optical recording medium was produced in the same manner as in Example 35 except that a perfluoropolyether lubricant having principal chain of $(F((CF_2)_3-O))_n$ (wherein n is an integer from 10 to 14) and having carboxyl group at one molecular terminal was spin-coated at a concentration of 0.02 wt. % on the protective film by using perfluorooctane as a solvent.

EXAMPLE 37

A magneto-optical recording medium was produced in the same manner as in Example 35 except that a perfluoropolyether lubricant having principal chain of $(F((CF_2)_3-O))_n$ (wherein n is an integer from 10 to 14) and having ester group at one molecular terminal was spin-coated at a concentration of 0.02 wt. % on the protective film by using perfluorooctane as a solvent.

EXAMPLE 38

A magneto-optical recording medium was produced in the same manner as in Example 35 except that a perfluoropolyether lubricant having principal chain of $(F((CF_2)_3-O))_n$ (wherein n is an integer from 10 to 14) and having piperonyl group at one molecular terminal was spin-coated at a concentration of 0.02 wt. % on the protective film by using perfluorooctane as a solvent.

EXAMPLE 39

A magneto-optical recording medium was produced in the same manner as in Example 35 except that a perfluoropolyether lubricant having principal chain of $(-(CF_2)_2-O)_n(CF_2-O)_m-)$ (wherein n is an integer from 9 to 13, and m is an integer from 9 to 13) and having hydroxyl group at both molecular terminals was spin-coated at a concentration of 0.02 wt. % on the protective film by using perfluorooctane as a solvent.

EXAMPLE 40

A magneto-optical recording medium was produced in the same manner as in Example 35 except that a perfluoropolyether lubricant having principal chain of $(-(CF_2)_2-O)_n(CF_2-O)_m-)$ (wherein n is an integer from 9 to 13, and m is an integer from 9 to 13) and having carboxyl group at both molecular terminals was spin-coated at a concentration of 0.02 wt. % on the protective film by using perfluorooctane as a solvent.

EXAMPLE 41

A magneto-optical recording medium was produced in the same manner as in Example 35 except that a perfluoropolyether lubricant having principal chain of $(-(CF_2)_2-O)_n(CF_2-O)_m-)$ (wherein n is an integer from 9 to 13, and m is an integer from 9 to 13) and having ester group at both molecular terminals was spin-coated at a concentration of 0.02 wt. % on the protective film by using perfluorooctane as a solvent.

EXAMPLE 42

A magneto-optical recording medium was produced in the same manner as in Example 35 except that a perfluoropolyether lubricant having principal chain of $(-(CF_2)_2-O)_n(CF_2-O)_m-)$ (wherein n is an integer from 9 to 13, and m is an integer from 9 to 13) and having piperonyl group at both molecular terminals was spin-coated at a concentration of 0.02 wt. % on the protective film by using perfluorooctane as a solvent.

EXAMPLE 43

A magneto-optical recording medium was produced in the same manner as in Example 35 except that the protective film surface was treated by radiation for 90 seconds with a low pressure mercury lamp for generating light beams having wavelengths of 185 nm and 254 nm in the atmospheric air, stearylamine $C_{18}H_{37}$—$NH_2$) and partially fluorinated ester ($C_{17}H_{31}COOC_2H_4C_6F_{13}$) as a liquid at ordinary temperature were thereafter spin-coated on the protective film at a concentration of 0.04 wt. % respectively by using methyl isobutyl ketone as a solvent, and a protective film of 10 nm composed of diamond-like carbon containing hydrogen and nitrogen was formed by means of the plasma CVD method by using methane gas as a monomer gas and using hydrogen gas and nitrogen gas as carrier gases on the surface of the floating type slider having the solid immersion lens and the coil for modulating the magnetic field on the side of the optical head. The composition ratio between oxygen and carbon of the protective film surface was measured by means of the X-ray photoelectron spectroscopy analysis method before the application of the lubricant by means of the spin coating. As a result, the O/C ratio was 0.35.

EXAMPLE 44

A magneto-optical recording medium was produced in the same manner as in Example 43 except that the protective film surface was plasma-treated with a high frequency of 13.56 MHz in an atmosphere of an oxygen pressure of 5 mTorr, and then stearylamine ($C_{18}H_{37}$—$NH_2$) and partially fluorinated ester ($C_{17}H_{31}COOC_2H_4C_6F_{13}$) as a liquid at ordinary temperature were spin-coated on the protective film at a concentration of 0.04 wt. % respectively by using methyl isobutyl ketone as a solvent. The composition ratio between oxygen and carbon of the protective film surface was measured by means of the X-ray photoelectron spectroscopy analysis method before the application of the lubricant by means of the spin coating. As a result, the O/C ratio was 0.39.

EXAMPLE 45

A magneto-optical recording medium was produced in the same manner as in Example 35 except that N,N-dimethylstearylamine ($C_{18}H_{37}$—$N(CH_3)_2$) and partially fluorinated ester ($C_{17}H_{31}COOC_2H_4C_6F_{13}$) as a liquid at ordinary temperature were spin-coated on the protective film at a concentration of 0.04 wt. % respectively by using methyl isobutyl ketone as a solvent. The composition ratio between oxygen and carbon of the protective film surface was measured by means of the X-ray photoelectron spectroscopy analysis method before the application of the lubricant by means of the spin coating. As a result, the O/C ratio was 0.35.

EXAMPLE 46

A magneto-optical recording medium was produced in the same manner as in Example 43 except that stearylamine $C_{18}H_{37}$—$NH_2$) and partially fluorinated ester (($CF_3)_2CF$ $(CF_2)_{10}CH_2CH[OCOC(CH_3)_2(C_6H_{13})]CH_2[OCOC(CH_3)_2(C_6H_{13})])$ as a liquid at ordinary temperature were spin-coated on the protective film at a concentration of 0.04 wt. % respectively by using methyl isobutyl ketone as a solvent. The composition ratio between oxygen and carbon of the protective film surface was measured by means of the X-ray photoelectron spectroscopy analysis method before the application of the lubricant by means of the spin coating. As a result, the O/C ratio was 0.35.

EXAMPLE 47

A magneto-optical recording medium was produced in the same manner as in Example 43 except that stearylamine ($C_{18}H_{37}$—$NH_2$) and partially fluorinated ester (($CF_3)_2CF$ $(CF_2)_{10}CH_2CH(OCOC(CH_3)_2(C_6H_{13}))CH_2(OCOC(CH_3)_2 (C_6H_{13})))$ as a liquid at ordinary temperature were spin-coated on the protective film at a concentration of 0.04 wt. % respectively by using methyl isobutyl ketone as a solvent. The composition ratio between oxygen and carbon of the protective film surface was measured by means of the X-ray photoelectron spectroscopy analysis method before the application of the lubricant by means of the spin coating. As a result, the O/C ratio was 0.35.

EXAMPLE 48

A magneto-optical recording medium was produced in the same manner as in Example 43 except that stearylamine ($C_{18}H_{37}$—$NH_2$) and partially fluorinated ester ($[(CH_3)_2CH (CH_3)CH]_2C(CH_3)COOCH_2C_6F_{12}CH_2OCOC(CH_3)[(CH_3)HCH(CH_3)_2]_2$) as a liquid at ordinary temperature were spin-coated on the protective film at a concentration of 0.04 wt. % respectively by using methyl isobutyl ketone as a solvent. The composition ratio between oxygen and carbon of the protective film surface was measured by means of the X-ray photoelectron spectroscopy analysis method before the application of the lubricant by means of the spin coating. As a result, the O/C ratio was 0.35.

EXAMPLE 49

A magneto-optical recording medium was produced in the same manner as in Example 43 except that stearylamine ($C_{18}H_{37}$—$NH_2$) and partially fluorinated ester ($[(CH_3)_2CH (CH_3)CH]_2C(CH_3)COOCH_2C_6F_{13}$) as a liquid at ordinary temperature were spin-coated on the protective film at a concentration of 0.04 wt. % respectively by using methyl isobutyl ketone as a solvent. The composition ratio between oxygen and carbon of the protective film surface was measured by means of the X-ray photoelectron spectroscopy analysis method before the application of the lubricant by means of the spin coating. As a result, the O/C ratio was 0.35.

EXAMPLE 50

A magneto-optical recording medium was produced in the same manner as in Example 43 except that stearylamine ($C_{18}H_{37}$—$NH_2$) and $CH_3(CH_2)_{110}(CH_2)_3NHCOCF_2 (OC_2F_4)_{10}(OCF_2)_{10}CF_2CONH(CH_2)_{30}(CH_2)_{11}CH_3$ as a liquid at ordinary temperature were spin-coated on the protective film at a concentration of 0.04 wt. % respectively by using methyl isobutyl ketone as a solvent. The composition ratio between oxygen and carbon of the protective film surface was measured by means of the X-ray photoelectron spectroscopy analysis method. As a result, the O/C ratio was 0.35.

EXAMPLE 51

A magneto-optical recording medium was produced in the same manner as in Example 35 except that a floating type slider was produced, which had the coil for modulating the magnetic field and the solid immersion lens without having the protective film on the slider surface.

EXAMPLE 52

A magneto-optical recording medium was produced in the same manner as in Example 47 except that a floating type slider was produced, which had the coil for modulating the magnetic field and the solid immersion lens without having the protective film on the slider surface.

Comparative Example 3

A polycarbonate substrate of the 3.5" size having lands and grooves and having no CSS zone was produced by means of the injection molding method by using an Ni stamper. An AlTi refractive layer of 50 nm, a first SiNx layer of 30 nm, a TbFeCo recording layer of 20 nm, and a second SiNx layer of 80 nm were successively formed by sputtering on the substrate. After that, a perfluoropolyether lubricant having principal chain of $(F((CF_2)_3-O))_n$ (wherein n is an integer from 10 to 14) and having hydroxyl group at one molecular terminal was spin-coated at a concentration of 0.02 wt. % on the protective film by using perfluorooctane as a solvent.

The optical head was produced as follows. That is, a protective film composed of hydrogen-containing diamond-like carbon of 10 nm was formed on the surface of the floating type slider having the solid immersion lens and the coil for modulating the magnetic field by means of the plasma CVD method by using methane gas as a monomer gas and using hydrogen gas as a carrier gas.

Comparative Example 4

A magneto-optical recording medium was produced in the same manner as in Comparative Example 3 except that a floating type slider was produced, which had the coil for modulating the magnetic field and the solid immersion lens without having the protective film on the slider surface.

The CSS test was performed under the following condition for the durability of the samples obtained as described above by using CSS Tester Model 7000 produced by Lotus. Results of the CSS test are shown in Table 6.

Number of rotation of disk: 3600 rpm;

Measurement radius: 22 mm;

Relative velocity: 8.29 m/sec;

Head floating height: 60 nm;

Head vertical load: 3.5 g;

Measurement environment: 20° C., 40% RH.

TABLE 6

| Medium | Coefficient of static friction | CSS durability (cycle) |
| --- | --- | --- |
| Example 35 | 0.57 | 20,000 |
| Example 36 | 0.55 | 20,000 |
| Example 37 | 0.56 | 20,000 |
| Example 38 | 0.52 | 20,000 |
| Example 39 | 0.45 | 20,000 |
| Example 40 | 0.47 | 20,000 |
| Example 41 | 0.50 | 20,000 |
| Example 42 | 0.48 | 20,000 |
| Example 43 | 0.47 | 20,000 |
| Example 44 | 0.43 | 20,000 |
| Example 45 | 0.45 | 20,000 |
| Example 46 | 0.47 | 20,000 |
| Example 47 | 0.43 | 20,000 |
| Example 48 | 0.46 | 20,000 |
| Example 49 | 0.48 | 20,000 |
| Example 50 | 0.47 | 20,000 |
| Example 51 | 0.65 | 20,000 |
| Example 52 | 0.64 | 20,000 |
| Comparative Example 3 | 5.98 | 700 |
| Comparative Example 4 | 5.87 | 200 |

As clarified from Table 6, the coefficient of static friction is less than 0.60, and the CSS durability is not less than 20,000 cycles, in the system obtained by combining the medium of the present invention and the floating type slider having the protective film on the slider surface. The coefficient of static friction is above 0.60, but the CSS durability is not less than 20,000 cycles, in the system obtained by combining the medium of the present invention and the floating type slider having no protective film on the slider surface. On the other hand, the coefficient of static friction is not less than 5.0 which is high, and the CSS durability is less than 1,000 cycles, in the system obtained by combining the medium of Comparative Example 3 in which the dot-shaped texture and the protective film are not provided on the medium and the floating type slider having the protective film on the slider surface, and in the system obtained by combining the medium of Comparative Example 3 in which the dot-shaped texture and the protective film are not provided on the medium and the floating type slider having no protective film on the slider surface (Comparative Example 4). It is understood that these systems are inferior in durability The optical recording medium, the optical head, and the optical recording device according to the present invention have been specifically explained above as exemplified by the case in which the magneto-optical recording medium is subjected to recording and reproduction. However, the optical recording medium of the present invention is not limited to the magneto-optical recording medium. The optical recording medium of the present invention may be an arbitrary optical recording medium such as the phase-change optical recording medium, the write-once type optical recording medium having the organic dye in the recording layer, and the read-only optical recording medium. That is, the present invention is directed to the optical recording medium for recording or reproducing information by being irradiated with a light beam, wherein the solid protective layer having the self-lubricating property is formed at the uppermost layer on the side of the optical recording medium irradiated with the light beam. An ordinary optical recording medium has a structure in which a recording layer is provided directly on a substrate or with a protective layer or the like interposed therebetween, for being irradiated with a recording or reproducing light beam from the side of the substrate. However, in the optical recording medium according to the present invention, the solid protective layer having the self-lubricating property is formed at the uppermost layer disposed on the side opposite to the substrate, and the recording or reproducing light beam is radiated from the side of the solid protective layer.

In the embodiments described above, the optical head has been explained as exemplified by the optical head for performing recording and reproduction on the magneto-optical recording medium. However, the structure of the optical head is not limited to the structure shown in the drawings, for which it is possible to adopt various structures. For example, when recording or reproduction is performed on the phase-change optical recording medium, the write-once type optical recording medium containing a dye in the recording layer, CD, and DVD-ROM, it is unnecessary to provide the magnetic coil as the magnetic field-applying means.

In the present invention, it is possible to suppress the occurrence of scratches formed by irregular sliding movement between the head and the medium due to variation in posture of the head associated with the movement during the seek performed by the optical head, and it is possible to decrease the reproduction error associated with the occurrence of scratches, by providing the protective film having the self-lubricating property such as carbon at least on one of the optical recording medium or the surface of the optical head opposing to the optical recording medium. It is possible to suppress the occurrence of scratches on the optical recording medium and it is possible to decrease the reproduction error associated with the occurrence of scratches, by using the lubricant containing perfluoropolyether having a molecular weight of 1000 to 8000 and having, at the molecular terminal, the group selected from at least one of hydroxyl group, carboxyl group, ester group, amino group, and piperonyl group, in place of the protective film having the self-lubricating property, or in addition to the protective film having the self-lubricating property. Therefore, the optical recording device incorporated with the optical head of the present invention is preferably used for performing high density recording and reproduction on the optical recording medium.

What is claimed is:

1. An optical head comprising a solid immersion lens installed in a floating type slider, for performing recording or reproduction on an optical recording medium, wherein:

a solid protective layer having a self-lubricating property is formed at least on a surface of the floating type slider opposing to the optical recording medium, the solid protective layer has a carboxyl group on its surface, and a composition ratio (O/C) of oxygen/carbon is not less than 0.1, a lubricating layer is further formed on the solid protective layer having the self-lubricating property, and the lubricating layer comprises a perfluoropolyether having a molecular weight of 1000 to 8000 and having, at least at one of its molecular terminals, a group selected from at least one of a hydroxyl group, carboxyl group, ester group, amino group and piperonyl group.

2. The optical head according to claim 1, wherein a film thickness of the solid protective layer having the self-lubricating property is 5 nm to 50 nm.

3. The optical head according to claim 1, wherein the solid protective layer having the self-lubricating property is composed of a material principally containing carbon.

4. The optical head according to claim 3, wherein the solid protective layer having the self-lubricating property composed of the material principally containing carbon contains at least one selected from the group consisting of nitrogen, hydrogen, and fluorine.

5. The optical head according to claim 1, wherein the solid protective layer having the self-lubricating property is a diamond-like carbon film.

6. The optical head according to claim 1, further comprising a magnetic coil for applying a recording or reproducing magnetic field.

7. An optical recording device provided with an optical head, for recording or reproducing information on an optical recording medium, wherein:

the optical head has a floating type slider and a solid immersion lens installed to the floating type slider, and a solid protective layer having a self-lubricating property is formed at least on a surface of the floating type slider opposing to the optical recording medium, the solid protective layer has a carboxyl group on its surface, and a composition ratio (O/C) of oxygen/carbon is not less than 0.1, a lubricating layer is further formed on the solid protective layer having the self-lubricating property, and the lubricating layer comprises a perfluoropolyether having a molecular weight of 1000 to 8000 and having, at least at one of its molecular terminals, a group selected from at least one of a hydroxyl group, carboxyl group, ester group, amino group and piperonyl group.

8. The optical recording device according to claim 7, wherein the optical head is provided with a magnetic field-applying unit, making it possible to perform recording and reproduction on a magneto-optical recording medium.

9. The optical recording device according to claim 7, wherein the solid immersion lens is one of a hemispherical solid immersion lens and a super spherical solid immersion lens.

10. The optical recording device according to claim 7, wherein the optical recording medium is an optical recording medium comprising, on a substrate, a reflective layer, a first dielectric layer, a recording layer, and a second dielectric layer successively in this order, for being irradiated with a light beam coming from a side of the second dielectric layer for recording or reproducing information, wherein a solid protective layer having a self-lubricating property is formed on the second dielectric layer.

11. An optical head for performing recording or reproduction on an optical recording medium, comprising:

a floating type slider;

a solid immersion lens installed in the floating type slider;

a solid protective layer which has a self-lubricating property and is formed at least on a surface of the floating type slider opposing to the optical recording medium; and a lubricating layer formed on the solid protective layer, the lubricating layer being formed of a mixed lubricant containing a lubricant having an amide group at its terminal and a lubricant which is liquid at ordinary temperature.

12. The optical head according to claim 11, wherein a film thickness of the solid protective layer having the self-lubricating property is 5 nm to 50 nm.

13. The optical head according to claim 11, wherein the solid protective layer having the self-lubricating property is composed of a material principally containing carbon.

14. The optical head according to claim 13, wherein the solid protective layer having the self-lubricating property composed of the material principally containing carbon contains at least one selected from the group consisting of nitrogen, hydrogen and fluorine.

15. The optical head according to claim 11, wherein the solid protective layer having the self-lubricating property is a diamond-like carbon film.

16. An optical recording device provided with an optical head, for recording or reproducing information on an optical recording medium, the optical head comprising:

a floating type slider;

a solid immersion lens installed to the floating type slider;

a solid protective layer which has a self-lubricating property and is formed at least on a surface of the floating type slider opposing to the optical recording medium; and a lubricating layer formed on the solid protective layer, the lubricating layer being formed of a mixed lubricant containing a lubricant having an amide group at its terminal and a lubricant which is liquid at ordinary temperature.

17. The optical recording device according to claim 16, wherein the optical head is provided with a magnetic field-applying unit, making it possible to perform recording and reproduction on a magneto-optical recording medium.

18. The optical recording device according to claim 16, wherein the solid immersion lens is one of a hemispherical solid immersion lens and a super spherical solid immersion lens.

19. The optical recording device according to claim 16, wherein the optical recording medium is an optical recording medium comprising, on a substrate, a reflective layer, a first dielectric layer, a recording layer, and a second dielectric layer successively in this order, for being irradiated with a light beam coming from a side of the second dielectric layer for recording or reproducing information, wherein a solid protective layer having a self-lubricating property is formed on the second dielectric layer.

* * * * *